US008664592B2

(12) United States Patent
Nishiguchi et al.

(10) Patent No.: US 8,664,592 B2
(45) Date of Patent: Mar. 4, 2014

(54) TIME-OF-FLIGHT MASS SPECTROMETER

(75) Inventors: Masaru Nishiguchi, Hirakata (JP); Shinji Miyauchi, Kyoto (JP); Yoshihiro Ueno, Uji (JP)

(73) Assignee: Shimadzu Corporation, Kyoto-Shi (JP)

( * ) Notice: Subject to any disclaimer, the term of this patent is extended or adjusted under 35 U.S.C. 154(b) by 0 days.

(21) Appl. No.: 13/821,202

(22) PCT Filed: Sep. 6, 2011

(86) PCT No.: PCT/JP2011/070270
§ 371 (c)(1), (2), (4) Date: Mar. 6, 2013

(87) PCT Pub. No.: WO2012/033094
PCT Pub. Date: Mar. 15, 2012

(65) Prior Publication Data

US 2013/0168547 A1 Jul. 4, 2013

(30) Foreign Application Priority Data

Sep. 8, 2010 (JP) ................................ 2010-201261

(51) Int. Cl.
*H01J 49/00* (2006.01)
*H01J 49/06* (2006.01)
*G01N 27/62* (2006.01)

(52) U.S. Cl.
USPC ............................ 250/287; 250/281; 250/282

(58) Field of Classification Search
USPC .......................................... 250/281, 282, 287
See application file for complete search history.

(56) References Cited

U.S. PATENT DOCUMENTS

| | | | | |
|---|---|---|---|---|
| 6,781,122 B2 * | 8/2004 | Colburn et al. | ............... | 250/287 |
| 7,075,065 B2 * | 7/2006 | Colburn et al. | ............... | 250/287 |
| 7,148,472 B2 * | 12/2006 | Glukhoy | ....................... | 250/287 |
| 2005/0230614 A1 * | 10/2005 | Glukhoy | ....................... | 250/287 |
| 2013/0161508 A1 * | 6/2013 | Sapargaliyev et al. | ........ | 250/282 |
| 2013/0221216 A1 * | 8/2013 | Makarov et al. | .............. | 250/282 |

FOREIGN PATENT DOCUMENTS

| | | |
|---|---|---|
| JP | 59123154 A | 7/1984 |
| JP | 60119067 A | 6/1985 |

OTHER PUBLICATIONS

Karataev, et al., "New Method for Focusing Ion Bunches in Time-of-Flight Mass Spectrometers" Soviet Physics—Technical Physics, vol. 16, No. 7, pp. 1177-1179, Jan. 1972.

(Continued)

*Primary Examiner* — David A Vanore
(74) *Attorney, Agent, or Firm* — Bingham McCutchen LLP

(57) ABSTRACT

Provided is a time-of-flight mass spectrometer having a reflectron which eliminates energy dependency of the flight time of ions having the same m/z while ensuring a high degree of design freedom. An electric field created by the reflectron is virtually divided into a decelerating region for decelerating ions and a reflecting region for reflecting ions. For an ion having a mass-to-charge ratio which has departed with initial energy higher than $U_d$, the total flight time required for the ion to travel through a free-flight region and the decelerating region into the reflecting region and return will be equal to the total flight time required for an ion of the same mass-to-charge ratio to make a round trip in which the ion turns around at a point of the reference potential value at the boundary between the decelerating region and the reflecting region or in the decelerating region.

14 Claims, 8 Drawing Sheets

(56) References Cited

OTHER PUBLICATIONS

Japanese language international search report dated Dec. 13, 2011 and its English language translation issued in corresponding PCT application PCT/JP2011/070270.

Japanese language international preliminary report on patentability dated Apr. 9, 2013 and its English language translation issued in corresponding PCT application PCT/JP20111070270.

* cited by examiner

TIME-OF-FLIGHT MASS SPECTROMETER

TECHNICAL FIELD

The present invention relates to a time-of-flight mass spectrometer, and more specifically, to a time-of-flight mass spectrometer using a reflectron (reflector).

BACKGROUND ART

The time-of-flight mass spectrometer (which is hereinafter referred to as a "TOFMS") is a device for calculating the mass-to-charge ratio of an ion using the fact that the flying speed of an accelerated ion varies depending on the mass-to-charge ratio of the ion. In this device, ions are made to fly a predetermined distance, the time of flight (or "which is appropriately referred to as the "flight time" in this specification) of each of the ions during their flight is measured, and the mass-to-charge ratio of each ion is computed from the flight time. In the TOFMS, since the flying speed of an ion depends on the amount of initial energy given from an electric field or the like, the flight time of each ion has energy dependency. As a result, the initial energy width of an ion packet (a group of ions with the same mass-to-charge ratio) affects the mass-resolving power of the device. Therefore, improving the energy-focusing property of the flight time of the ion is one of the major problems to be solved for improving the performance of the TOFMS.

A commonly known, effective solution to the previously described problem is the use of a reflectron capable of the energy-focusing of the flight time by reflecting ions by a reflecting electric field. In the reflectron, for a group of ions having the same mass-to-charge ratio, an ion with a higher energy (and hence a higher speed) penetrates more deeply into the reflecting electric field and turns around, thus covering a longer traveling path (flight distance). This difference in the traveling length corrects the error in the flight time associated with the variation in the amount of initial energy of the ions and thereby improves the energy-focusing property of the flight time. Reflecting the ions by the reflectron is also effective for providing a longer flight distance without increasing the entire size of the device. For a TOFMS, a longer flight distance gives a higher mass-resolving power. Thus, the use of a reflectron is advantageous in that the mass-resolving power can be improved while suppressing the size and cost of the device.

The simplest structure of the reflectron is a single-stage reflectron, which uses one uniform decelerating electric field of an even field strength. Unfortunately, the single-stage reflectron cannot achieve a sufficiently high level of energy-focusing property of the flight time. Therefore, a two-stage reflectron is commonly used in recent years, which employs the combination of two modes of uniform decelerating electric fields as the reflecting electric field, with the second-stage electric field being designed to repel ions (see Non-Patent Document 1). The combination of the two uniform decelerating electric fields allows the two-stage reflectron to appropriately adjust its dimensions (e.g. length) and the strengths of the two fields so as to achieve a higher level of energy-focusing property of the flight time than that of the one-stage reflectron. Therefore, almost all the commercially available TOFMSs use two-stage reflectrons to create a system that is simple structured and yet can achieve a relatively high performance.

An approach for improving the energy-focusing property of the flight time in a conventional TOFMS having the previously described configuration is hereinafter schematically described.

As already explained, the flight time of an ion has energy dependency since the speed of an ion injected into the flight space of a TOFMS normally depends on the initial energy. In conventional TOFMSs, the flight time of an ion is expressed in the form of a series expansion with respect to the initial energy of the ion in order to evaluate the energy dependency of the flight time in the stage of theoretical design. Consider the case where, for a given type of TOFMS, U denotes the initial energy of an ion with mass m and charge number z, and $U_0$ and $T_0$ respectively denote the reference value of the initial energy and that of the flight time for the same kind of ions (having the same mass and charge number). Under these conditions, the flight time $T_0$ will be a function including device dimensions as constant factors and having the mass-to-charge ratio m/z of the ion as a variable. On the other hand, the flight time T of an ion having an arbitrary amount of initial energy U will be expressed as the following equation (1) using the flight time $T_0$ of the reference ion and the reference initial energy $U_0$:

$$T = T_0 + T_1\left(\frac{U - U_0}{U_0}\right) + T_2\left(\frac{U - U_0}{U_0}\right)^2 + T_3\left(\frac{U - U_0}{U_0}\right) + \ldots \quad (1)$$

Equation (1) is a series expansion representing the flight time as a sum of powers of the ratio of the energetic displacement to the energy of the reference ion. The coefficient $T_1$, $T_2$, . . . of the term of each order of the expansion is called a flight-time aberration coefficient, which is expressed by using device parameters, such as the device dimensions or voltage conditions. For this expression, one method for reducing the energy dependency of the flight time is, as in the case of the existing aberration theory, to adjust the device parameters so that as many of the aberration coefficients as possible from the lowest-order term through the higher-order terms will be zero. For example, in the previously described two-stage reflectron using two-stage uniform decelerating electric fields, it is possible to appropriately adjust the lengths and strengths of the two uniform decelerating electric fields so as to zero the aberration coefficients up to the second order, thus achieving the second-order energy focusing. However, the third and higher-order aberration coefficients of the two-stage reflectron are not zero, and there remains some energy dependency due to these coefficients. Therefore, when the initial energy width of the ions is large, the observed flight-time peak will be significantly broadened and the mass-resolving power will be low.

Another example is a method proposed in Patent Document 1, in which the energy dependency of the flight time of the ion within the reflecting electric field is completely eliminated by increasing the field strength in the reflecting electric field in proportion to the penetration depth of the ion, i.e. by creating a parabolic potential distribution on the ion-beam axis, to make the motion of each ion a simple harmonic motion. In principle, the energy dependency of the flight time can be completely eliminated by this method. However, in practice, its performance cannot be fully exploited if the device does not satisfy a difficult structural requirement: the starting point of the ions and the detector must be located on the boundary of the reflecting electric field. To address this problem, a method has been proposed in Patent Document 2, in which the function form of the strength distribution of the reflecting electric field is changed so that an energy-focusing property of the flight time comparable to that of the one-stage reflectron can be achieved over a broader range of energy even if the starting point of the ions and the detector are separated from the reflecting electric field by a free space.

In recent years, mass spectrometers, including TOFMSs, have come to be used to analyze a wider variety of substances having more complicated structures than ever before. The demands for further improvements in the performances of the measurement, such as the accuracy, sensitivity and resolving power, have also become stronger. Despite the various innovative ideas applied thereto, the previously described conventional TOFMSs cannot achieve a sufficiently high energy-focusing property of the flight time to meet the aforementioned requirements. With an increase in the initial energy width of the ions, the observed peak width of the flight time also increases, lowering the mass resolving power. Accordingly, to achieve a high mass-resolving power, it is necessary to take some measures to reduce the initial energy width of the ions in the source from which ions are released. However, such measures have certain limitations. Thus, enhancing the energy-focusing property of the flight time in the flight space including a reflectron is very important to improve the mass-resolving power of the TOFMS.

BACKGROUND ART DOCUMENT

Patent Document

Patent Document 1: JP-A 59-123154
Patent Document 2: JP-A 60-119067

Non-Patent Document

Non-Patent Document 1: V. I. Karataev, "New Method for Focusing Ion Bunches in Time-of-Flight Mass Spectrometers", *Soviet Physics Technical Physics,* 1972, Vol. 16,

SUMMARY OF THE INVENTION

Problem to be Solved by the Invention

The present invention has been developed to solve the previously described problems, and its primary objective is to provide a time-of-flight mass spectrometer which has a high mass-resolving power due to an improved energy-dependency of the flight time of the ions while ensuring a high degree of freedom in the structural design or circuit design of an actual device.

Means for Solving the Problems

To solve the aforementioned problem, in the time-of-flight mass spectrometer according to the present invention, the shape of the electrostatic field created by the reflectron for reflecting the ions, i.e. the potential distribution along the central axis, is derived by a characteristic method.

Thus, the present invention aimed at solving the aforementioned problem is a time-of-flight mass spectrometer having an energy supplier for giving ions to be analyzed a constant amount of energy to make the ions fly and a time-of-flight mass separator for separating the energy-given ions for each mass-to-charge ratio according to the difference in their flight time, wherein:

the mass separator includes a free-flight space in which ions are allowed to fly without being influenced by an electric field, a reflectron having a plurality of electrodes for creating an electric field which acts on the ions flying in the free-flight space to reflect the ions backward, and a voltage supplier for applying a direct-current voltage to each of the electrodes of the reflectron; and the voltage supplier applies the direct-current voltage to each of the electrodes so that:

the electrostatic field created by the reflectron is virtually divided into a decelerating region for decelerating ions introduced thereinto and a reflecting region for reflecting backward the ions which have been decelerated through the decelerating region, the two regions being arranged along a traveling direction of the ions; the potential distribution along a central axis of the electrostatic field in the decelerating region is either a potential distribution defined by one kind of function or a combination of potential distributions defined by a plurality of different kinds of functions along the central axis; and the potential distribution along the central axis of the electrostatic field in the reflecting region is one kind of curved potential distribution for which a conditional equation to be satisfied by the flight time $T_r(E)$ of the ions in the reflecting region is determined so that a total flight time required for an ion having an initial energy equal to a reference potential $U_0$ set at a level equal to or lower than the maximal potential value $U_d$ in the decelerating region to fly through a round-trip path including the free-flight space, will be equal to a total flight time required for an ion having an initial energy E higher than $U_d$ to fly through a round-trip path including the free-flight space, the following equation (2) is used as a relational equation for determining an inverse function x(U) of the curved potential distribution U(x) in the reflecting region realizing the flight time $T_r(E)$, and the integral computation in equation (2) is either an analytic formula using a parameter defining the potential distribution of the electrostatic field in the decelerating field or a numerical solution obtained by a numerical computation:

$$x(U) = \frac{1}{\pi\sqrt{2m}} \int_0^U \frac{T_r(E)dE}{\sqrt{U-E}} \tag{2}$$

where m is the mass of an arbitrary ion of interest and U is an initial energy given to this ion.

In the time-of-flight mass spectrometer, or TOFMS, according to the present invention, the reflectron is typically composed of a plurality of ring electrodes arranged along the central axis. The direct-current voltages applied to the ring electrodes can be individually adjusted so that the electrostatic field created in the space surrounded by the ring electrodes will show the previously described potential distribution. The type of electrodes available for composing a reflectron is not limited to the ring electrode; any type of electrodes can be used as long as they can create an electrostatic field showing a desired potential distribution within the space into which ions are to be introduced. Furthermore, since the shape of the potential distribution created by the voltages applied to the electrodes constituting the reflection depends on the arrangement and shape of the electrodes as well as other factors, it is possible, for example, to realize a desired potential distribution by applying a predetermined direct-current voltage to each of the electrodes after the spacing of the neighboring electrodes is appropriately adjusted.

In the reflectron of the time-of-flight mass spectrometer according to the present invention, a field-free section (i.e. a section which allows the free flight of ions) or an accelerating electric field may be partially provided in the middle of the decelerating region as long as this region in its entirety is designed to be a system which decreases the kinetic energy of ions and yet ensures that an ion which has been given a predetermined amount of initial energy and begun flying can pass through it while losing its speed (i.e. they will not turn around without reaching the reflecting region). As far as such a condition is satisfied, it is possible to appropriately shape the potential distribution in the decelerating region for convenience of design or other factors without considering any other particular restrictions.

After the potential distribution of the electrostatic field in the decelerating region is thus determined, it is possible to uniquely determine the curved potential distribution U(x) of the electrostatic field from the aforementioned function x(U), based on an analytic formula using the potential value $U_d$ at the boundary of the decelerating region and the reflecting region (i.e. the maximal potential value in the decelerating region) as well as other parameters, such as the length of the decelerating region or the length of each of the electric fields defined by the plurality of different kinds of potential distribution functions in the decelerating region. The integral in the aforementioned function x(U) may not be analytically determinable, for example when the electrostatic potential distribution in the decelerating region is complex. In such a case, a numerical solution can be obtained by solving the integral by a specific numerical computation. Thus, the curved potential distribution U(x) of the electrostatic field in the reflecting region can be uniquely determined.

That is to say, in the present invention, the electrostatic field created by the reflectron is virtually divided into the decelerating region and the reflecting region which have different effects on the ions, rather than one homogeneous region. For this system, a potential distribution for the decelerating region is initially determined. Then, independently of the initial energy of the ions, a reference potential $U_0$ equal to or lower than the maximal potential value $U_d$ in the decelerating region is determined at the boundary between the decelerating and reflecting regions or in the decelerating region. The potential distribution in the reflecting region is determined so that, for an ion having a certain mass-to-charge ratio which has departed from a predetermined point with initial energy higher than $U_d$, the total flight time required for the ion to travel through the free-flight space and the decelerating region into the reflecting region, turn around in this reflecting region and return to the original point, will be equal to the total flight time required for an ion of the same mass-to-charge ratio to make a round trip in which the ion turns around at a point of the reference potential value at the boundary between the decelerating region and the reflecting region or in the decelerating region. By this method, the energy dependency of the flight time of the ions can be completely eliminated in theory, while ensuring a high degree of freedom in the system design.

As stated earlier, the potential distribution in the decelerating region has a high degree of freedom. However, in practice, using a complex potential distribution function for the decelerating region complicates the computation of the potential distribution function for the reflecting region. The computation will be even more complex in the previously described case of solving the integral not by an analytical method, but by a specific numerical computation for obtaining a numerical solution. Accordingly, the potential distribution function of the decelerating region should preferably be as simple as possible within a range where the system can exhibit desired performances (e.g. mass-resolving power) as a time-of-flight mass spectrometer.

As explained previously, a two-stage reflectron consisting of the combination of two-stage uniform decelerating electric fields is adopted in many current TOFMSs. Given this fact, it is relatively easy to use two-stage uniform decelerating electric fields as the decelerating region.

Accordingly, in one possible mode of the time-of-flight mass spectrometer according to the present invention, the decelerating region includes two-stage uniform decelerating electric fields defined by two kinds of functions each of which has a different linear potential gradient; and with the reference potential $U_0$ set to be equal to the maximal potential $U_d$ of the decelerating region, the curved potential distribution along the central axis of the electrostatic field in the reflecting region is determined by an inverse function x(U) expressed as the following equation (3):

$$x(U) = \frac{L}{\pi}\left[\sqrt{\frac{U}{U_d}} - \arctan\sqrt{\frac{U}{U_d}} + 2\frac{d_1}{U_1}\left\{\sqrt{UU_d} - (U+U_d)\arctan\sqrt{\frac{U}{U_d}}\right\} - 2\left(\frac{d_1}{U_1} - \frac{d_2}{U_2}\right)\left\{\sqrt{UU_2} - (U+U_2)\arctan\sqrt{\frac{U}{U_2}}\right\} + \pi\frac{d_2}{U_2}U\right] \tag{3}$$

where L is the length of the free-flight space, $d_1$ and $d_2$ are the ratios of the lengths of the first-stage uniform decelerating electric field and the second-stage uniform decelerating electric field in the decelerating region to the length of the free-flight space, respectively, $U_1$ is the potential height of the first-stage uniform decelerating electric field, and $U_2$ is the potential height of the second-stage uniform decelerating electric field, hence $U_d=U_1+U_2$.

In the previously described mode, it is preferable that the ratios of the lengths of the uniform decelerating electric fields in the first and second stages of the decelerating region to the length of the free-flight space, i.e. $d_1$ and $d_2$, be set so that $d_1=d_2=d$, and d is within the range of $0.01<d<0.5$. Under these conditions, the electric field of the decelerating region and that of the reflecting region will smoothly connect to each other, which facilitates the production of an actual device.

In a preferable mode of the present invention, when a most ideal parametric condition is determined by evaluating the continuity of the electric field and the continuity of the differential coefficient of the electric field as a condition for a smooth connection of the electric field at the boundary between the decelerating region and the reflecting region, d has a value which satisfies the following equation (4):

$$d = \frac{u_2^{3/2}\left(\sqrt{u_2}+1\right)}{4\left(\sqrt{u_2}-u_2+1\right)} \tag{4}$$

where $u_2=U_2/U_d$.

As already noted, a field-free section may be present in the decelerating region. Accordingly, in another possible mode of the time-of-flight mass spectrometer according to the present invention:

the decelerating region includes two-stage uniform decelerating electric fields and an auxiliary free-flight space located between the two-stage uniform decelerating electric fields, the two-stage uniform decelerating electric fields being defined by two kinds of functions each of which has a different linear potential gradient, and the auxiliary free-flight space being free from influence of any electric field; and with the reference potential $U_0$ set to be equal to the maximal potential $U_d$ of the decelerating region, the curved potential distribution along the central axis of the electrostatic field in the reflecting region is determined by an inverse function x(u) expressed as the following equation (5):

$$x(u) = \frac{L}{\pi}\left[\pi d_2 \frac{u}{u_2} + \sqrt{u} - \arctan\sqrt{u} + 2\frac{d_1}{u_1}\left\{\sqrt{u} - (u+1)\arctan\sqrt{u}\right\} + 2f\left\{\sqrt{\frac{u}{u_2}} - \arctan\sqrt{\frac{u}{u_2}}\right\} - 2\left(\frac{d_1}{u_1} - \frac{d_2}{u_2}\right)\left\{\sqrt{uu_2} - (u+u_2)\arctan\sqrt{\frac{u}{u_2}}\right\}\right] \tag{5}$$

where L is the length of the free-flight space, $d_1$, f and $d_2$ are the ratios of the lengths of the first-stage uniform decelerating electric field, the auxiliary free-flight space and the second-stage decelerating electric field in the decelerating region, respectively, $U_1$ is the potential height of the first-stage uniform decelerating electric field, $U_2$ is the potential height of the second-stage uniform decelerating electric field, hence $U_d=U_1+U_2$, and $u=U/U_d$, $u_1=U_1/U_d$, and $u_2=U_2/U_d$.

In this configuration, the most ideal condition for a smooth connection of the electric field at the boundary between the decelerating region and the reflecting region is that d has a value which satisfies the following equation (6):

$$d = \frac{(2f + u_2^{3/2})(\sqrt{u_2} + 1)}{4(\sqrt{u_2} - u_2 + 1)} \tag{6}$$

provided that $d=d_1=d_2$.

In the previously described mode, the accelerating potential distribution in the energy supplier for giving energy to the ions to make them fly is not considered. By specifying this accelerating potential distribution, it is possible to derive a more appropriate potential distribution in the reflecting region which can eliminate the energy dependency for the entire flight time, including the variations in the flight time of the ions occurring in the accelerating region.

Accordingly, in another mode of the time-of-flight mass spectrometer according to the present invention:

the energy supplier includes a one-stage uniform accelerating electric field defined by a linear potential gradient sloped downward in the traveling direction of the ions, whereas the decelerating region includes two-stage uniform decelerating electric fields defined by two kinds of functions each of which has a different linear potential gradient; and with the reference potential $U_0$ set to be equal to the maximal potential $U_d$ of the decelerating region, the curved potential distribution along the central axis of the electrostatic field in the reflecting region is determined by an inverse function x(u) expressed as the following equation (7):

$$x(u) = \frac{L}{\pi}\left[\pi\frac{d_2}{u_2}u + \sqrt{u} - \arctan\sqrt{u} + \left(\frac{a}{u_a} + 2\frac{d_1}{u_1}\right)\left\{\sqrt{u} - (u+1)\arctan\sqrt{u}\right\} - 2\left(\frac{d_1}{u_1} - \frac{d_2}{u_2}\right)\left\{\sqrt{uu_2} - (u+u_2)\arctan\sqrt{\frac{u}{u_2}}\right\}\right] \tag{7}$$

where $U_a$ is the highest potential of the uniform accelerating electric field, L is the length of the free-flight space, a, $d_1$, and $d_2$ are the ratios of the lengths of the uniform accelerating electric field, the first-stage uniform decelerating electric field and the second-stage decelerating electric field in the decelerating region, respectively, $U_1$ is the potential height of the first-stage uniform decelerating electric field, $U_2$ is the potential height of the second-stage uniform decelerating electric field, hence $U_d=U_1+U_2$, and $u=U/U_d$, $u_1=U_1/U_d$, $u_2=U_2/U_d$ and $u_a=U_a/U_d$.

In this configuration, the most ideal condition for a smooth connection of the electric field at the boundary between the decelerating region and the reflecting region is that d has a value which satisfies the following equation (8):

$$4d\frac{\sqrt{u_2} - u_2 +}{u_2^{3/2}(\sqrt{u_2} + 1)} = 1 - \frac{2a}{u_a} \tag{8}$$

provided that $d=d_1=d_2$.

It is also possible to use, as the decelerating region, a one-stage uniform decelerating electric field instead of the two-stage uniform decelerating electric fields. That is to say, in another mode of the time-of-flight mass spectrometer according to the present invention:

the decelerating region includes a one-stage uniform decelerating electric field defined by a function having a linear potential gradient; and with the reference potential $U_0$ set to be equal to the maximal potential $U_d$ of the decelerating region, the curved potential distribution along the central axis of the electrostatic field in the reflecting region is determined by an inverse function x(U) expressed as the following equation (9):

$$x(U) = \frac{L}{\pi}\left[\pi d\frac{U}{U_d} + (1+2d)\sqrt{\frac{U}{U_d}} - \left(1 + 2d + 2d\frac{U}{U_d}\right)\arctan\sqrt{\frac{U}{U_d}}\right] \tag{9}$$

where L is the length of the free-flight space, d is the ratio of the length of the decelerating region to the length of the free-flight space, and d is set within a range of $0.2<d<0.8$.

In this configuration, when an optimal condition is determined by evaluating the continuity of the electric field and the continuity of the differential coefficient of the electric field as a condition for a smooth connection of the electric field at the boundary between the decelerating region and the reflecting region, the value of d is 0.25.

Also in this case, the accelerating potential distribution may be specified to derive a more appropriate potential distribution in the reflecting region which can eliminate the energy dependency for the entire flight time.

That is to say, in another mode of the time-of-flight mass spectrometer according to the present invention:

the energy supplier includes a one-stage uniform accelerating electric field defined by a linear potential gradient sloped downward in the traveling direction of the ions, and the decelerating region includes a one-stage uniform decelerating electric field defined by a function having a linear potential gradient; and with the reference potential $U_0$ set to be equal to the maximal potential $U_d$ of the decelerating region, the curved potential distribution along the central axis of the electrostatic field in the reflecting region is determined by an inverse function x(u) expressed as the following equation (10):

$$x(u) = \frac{L}{\pi}\left[\pi du + \sqrt{u} - \arctan\sqrt{u} + \left(\frac{a}{u_a} + 2d\right)\left\{\sqrt{u} - (u+1)\arctan\sqrt{u}\right\}\right] \quad (10)$$

where $U_a$ is the highest potential of the uniform accelerating electric field, L is the length of the free-flight space, a and d are the ratios of the lengths of the uniform accelerating electric field and the decelerating region to the length of the free-flight space, respectively, $u=U/U_d$, and $u_a=U_a/U_d$.

In this configuration, the most ideal condition for a smooth connection of the electric field at the boundary between the decelerating region and the reflecting region is that d has a value which satisfies:

$$4d=1-(2a/u_a).$$

As described previously, in the time-of-flight mass spectrometer according to the present invention, it is possible to separately apply an appropriate voltage to each of the plurality of electrodes constituting the reflectron to create a potential distribution having a desired shape. However, separately adjusting each of the voltage values is not only troublesome but also increases the cost of the voltage supplier (power supply). Accordingly, in one mode of the time-of-flight mass spectrometer according to the present invention, the voltage supplier uses resistive division to apply a voltage to at least one electrode among the plurality of electrodes constituting the reflectron, and the interval between the aforementioned one electrode and a neighboring electrode is adjusted so as to create a desired potential distribution.

In a more preferable mode, the voltage supplier includes a ladder-type resistive divider circuit designed to separately apply a voltage to each of the electrodes other than those at both ends among the plurality of electrodes constituting the reflecting region in the reflection. In particular, using a ladder-type resistive divider circuit composed of resistors of the same resistance is advantageous for suppressing the device cost to even lower levels, as well as for facilitating equalization of the temperature coefficient at zeroth order of the resistance and other characteristics of the resistors to ensure an intended performance.

The time-of-flight mass spectrometer according to the present invention may be constructed not only as a so-called reflection time-of-flight mass spectrometer using one free-flight space and one reflection to make ions fly through a single round-trip path, but also as a multi-reflection reflection time-of-flight mass spectrometer using two sets of free-flight spaces and reflections, with the two reflections being placed opposite to each other across the two free-flight spaces so as to reflect ions multiple times between the two reflections.

The direction of introducing ions into the decelerating region of the reflection does not always need to coincide with the central axis of the reflection. When the introducing direction of the ions is at an angle to the central axis of the central axis, the path of the ions that have been reflected in the reflecting region (backward path) will be diverted from the path followed by the ions during their flight toward the reflecting region (forward path). However, if the spatial distribution of the potential is rotationally symmetrical with respect to the central axis, the ions will experience the same effect from the electrostatic field and hence behave in the same manner as in the case where the forward path coincides with the backward path.

Effect of the Invention

As compared to conventional devices, the time-of-flight mass spectrometer according to the present invention can achieve a higher level of mass-resolving power since the energy dependency of the flight time of the ions can be completely eliminated in theory. Furthermore, since the time-of-flight mass spectrometer according to the present invention has a certain degree of freedom for determining the potential distribution function in the decelerating region of the reflectron, it is possible to provide the device with a degree of design freedom while achieving the energy independency of the flight time of the ions. This not only helps the designing but also leads to the downsizing and cost reduction of the device.

BEST MODE FOR CARRYING OUT THE INVENTION

Initially, a method for designing the potential distribution of an electrostatic field created by a reflectron characteristic of the TOFMS according to the present invention will be described in detail.

Figure 1:
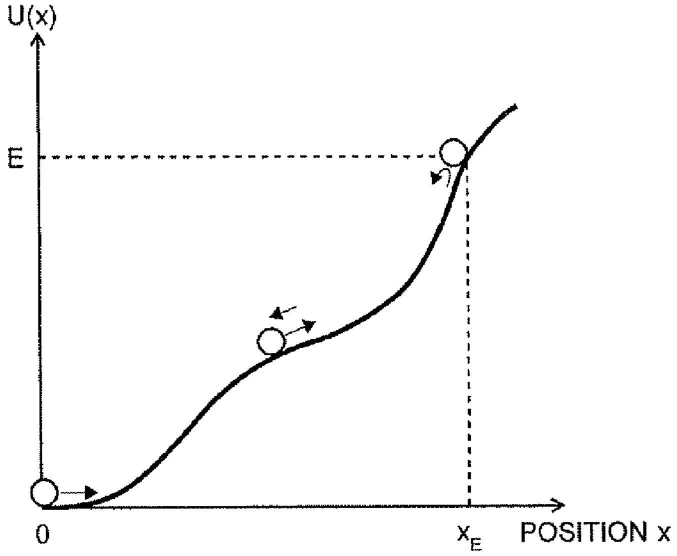
FIG. 1 is a conceptual diagram showing a potential distribution in a reflecting electric field and a behavior of an ion.

Consider the motion of an ion of mass m which has departed from a certain point and is reflected by a reflecting electric field and returns to the original point. For ease of explanation, suppose that this motion of the ion is one-dimensional (along the x-direction), the initial energy of the on is E, and the potential distribution due to the reflecting electric field is expressed as function U(x). If the potential distribution of the reflecting electric field is V(x), the aforementioned potential distribution function U(x) is expressed as U(x)=zeV(x), where z is the charge number of the ion and e is the elementary charge. The starting point of the ion is located at the origin (x=0). The reflecting electric field has a potential of zero at the origin, i.e. U(0)=0. FIG. 1 is a conceptual diagram showing the potential distribution in the reflecting electric field and the behavior of the ion. In FIG. 1, the horizontal axis indicates the position x on the central axis in the reflecting electric field and the vertical axis indicates the potential U(x).

A mechanical consideration shows that the time required for an ion that has departed from the origin to be reflected by the reflecting electric field and return to the origin is given by the following equation (11).

$$TE = \sqrt{2m}\int_0^{x_E}\frac{dx}{\sqrt{E-U(x)}} \tag{11}$$

As shown in FIG. 1, an ion that has been given initial energy E moves forward, losing its speed while moving upward along the potential gradient in the reflecting electric field. At position $x_E$ where the potential of the reflecting electric field equals the level of the initial energy E, the ion turns around and eventually returns to the original position, i.e. the origin. The above equation (11) gives the flight time required for an ion which has been given an arbitrary amount of potential energy to complete a round trip in the reflecting electric field. Inverting the relationship between position x and potential U(x) yields the following equation (12) as an equation that gives a potential distribution which realizes a given flight time for the round trip of an ion in the reflecting electric field. That such a relationship holds true is obvious from commonly known literatures, e.g. Landau and Lifshits, "Riron Butsurigaku Kyoutei: Rikigaku, Zoutei Dai 3-Pan (Mechanics, Third Edition, Course of Theoretical Physics)", Japanese translation by Tetsu Hiroshige and Iwao Mito, published by Tokyo Tosho Co., Ltd., 1997.

$$x(U) = \frac{1}{\pi\sqrt{2m}}\int_0^U\frac{T(E)dE}{\sqrt{U-E}} \tag{12}$$

In this equation, x(U) can be interpreted as a function that gives position x where the potential energy equals U. Accordingly, if this function x(U) is given, it is easy to derive its inverse function U(x), i.e. the potential distribution function.

As a simple example, consider the case of using equation (12) to compute a shape of the potential in which the flight time required for an ion to fly through a round-trip path in a reflecting electric field is independent of the ion's energy. Substituting a flight-time constant $T_a$, which is independent of the energy, into equation (12) yields the following equation (13):

$$x(U) = \frac{T_a}{\pi\sqrt{2m}}\int_0^U\frac{dE}{\sqrt{U-E}} \tag{13}$$

The integral computation on the right side of equation (13) is easy; its value is $2\sqrt{U}$. Accordingly, the potential distribution function U(x) in question will be as follows.

$$x(U) = \frac{T_a}{\pi}\sqrt{\frac{2U}{m}} \tag{14}$$

$$U(x) = \frac{\pi^2 m}{2T_a}x^2$$

This equation (14) shows that the potential distribution of the reflecting electric field has a parabolic shape, which agrees with what was derived in Patent Document 1. This fact demonstrates that a potential distribution function which gives a desired flight time can be determined by using equation (12). If the result of the potential distribution needs to be obtained in the form of algebraic equations as shown in equation (14), the integral on the right side of equation (12) must be analytically computable. However, even if the integral is not analytically computable, it is possible to obtain a numerical solution by performing the integration by a numerical computation.

As in the previously described example, equation (12) allows the determination of a potential distribution of the reflecting electric field in which the flight time of the ion does not have energy dependency. Using this equation, it is possible to overcome the previously described problem caused by the energy dependency of the flight time. Now, consider a system in which a free-flight region A with no electric field is provided before the reflectron, as in a normal type of reflectron TOFMS, and the reflecting electric field created by the reflectron is divided into a decelerating region B having one or more kinds of potential distributions along the central axis and a reflecting region C having one curved potential distribution. Naturally, this division between the decelerating region B and the reflecting region C is not tangible but is merely defined from the viewpoint of the effect of the electric fields on the ions.

Figure 2:
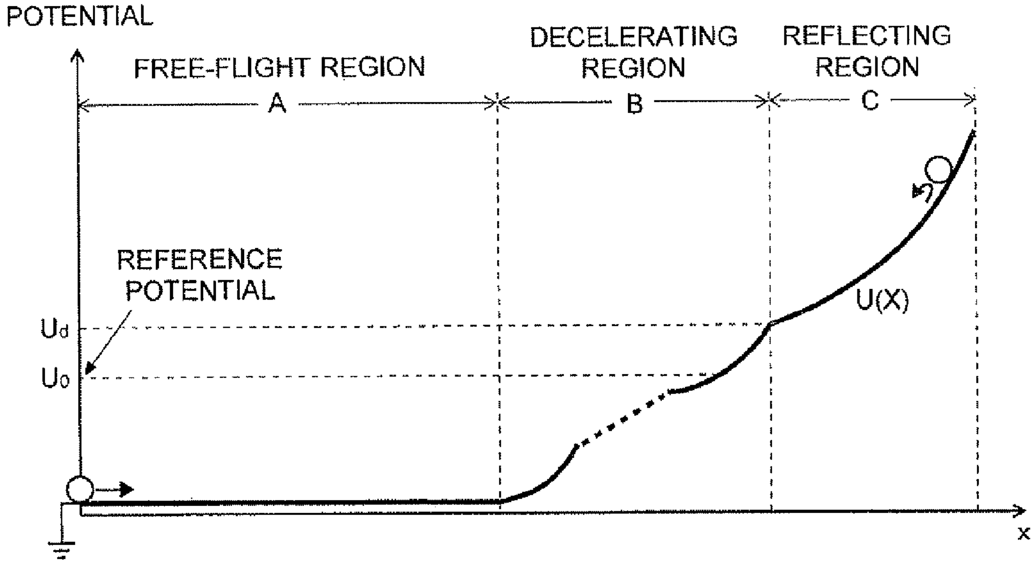
FIG. 2 is a schematic diagram of a potential distribution in the flight space of the TOFMS according to the present invention.

Similar to conventional reflectrons, in this ion optical system, an ion departs from a certain starting point in the free-flight region A and flies through the free-flight region A and the decelerating region B. Upon reaching the highest potential point, which is determined by the potential distribution in the reflecting region C and the initial energy of the ion, the ion turns around and once more travels through the decelerating region B and the free-flight region A in the opposite direction to the forward path, to be detected by a detector. The potential distribution along the central axis in this system is schematically shown in FIG. 2. It should be noted that the potential in this ion optical system is measured with reference to the potential of the free-flight region A (e.g. the ground potential).

Now, suppose that an appropriate potential distribution is given to the decelerating region B, with the maximal potential $U_d$. The decelerating region B may consist of a plurality of different potential distribution functions connected along the central axis, in which a free-flight space with no electric field and/or a partial accelerating electric field may additionally exist. That is to say, the decelerating region B only needs to be a region which as a whole decreases the kinetic energy of the ions; it may partially include a section that does not decrease the kinetic energy of the ions, or even a section that gives additional kinetic energy to them. However, in the decelerating region B, the section which borders the boundary with the reflecting region C must be a decelerating electric field. Accordingly, the maximal potential $U_d$ is inevitably equal to the potential at the boundary between the decelerating region B and the reflecting region C.

For an ion which passes through the decelerating region B and penetrates into the reflecting region C in the previously described process of turning ions around, the initial energy of the ion is hereinafter expressed as $U_d+E$. This is a representation of the ion's energy measured from the maximal potential $U_d$ in the decelerating region B.

The flight time of an ion in the free-flight region A can be calculated by the following equation (15):

$$T_0(U_d+E) = L\sqrt{\frac{m/z}{2}}\frac{1}{\sqrt{U_d+E}} \tag{15}$$

where L is the total length (the length covered by the round-trip flight) of the free-flight region A, which is at the reference potential.

Suppose that, when the initial energy of the ion is $U_d+E$, the time required for the ions to fly from the starting point of the decelerating region B to the point within the decelerating region B at which the potential becomes $U_1$ is given by the following formula (16) based on a given potential distribution function of the decelerating region B:

$$T_d(U_d+E,U_1) \tag{16}$$

where $U_1 \le U_d$. Depending on the form of the potential distribution function given to the decelerating region B, it may be possible to analytically compute formula (16) and provide a specific analytic formula. Even if formula (16) cannot be analytically computed, its value can be obtained by a numerical computation.

In the case where a free-flight space or an accelerating electric field partially exists in the decelerating region B, if the potential $U_1$ equals the potential in that free-flight space or the potential at the starting point of that accelerating electric field in the decelerating region B, the position in the decelerating region B cannot be uniquely determined for the potential. In such a case, formula (16) should basically be interpreted as representing the flight time for an ion to reach the point where the potential becomes equal to the aforementioned potential for the first time after the ion has entered the decelerating region B from the free-flight region A, whose potential is at the reference level of the ion optical system.

The potential distribution function of the reflecting region C is hereinafter denoted by U(x), and its inverse function by x(U), with the coordinate origin set at the starting point of the reflecting region C. For the potential distribution expressed by this function, let $T_r(E)$ denote the flight time for an ion with initial energy $U_d+E$ to make a round trip in the reflecting region C. Under these conditions, and taking into account the fact that the ion passes through the decelerating region B two times in the first and second halves of the round trip, respectively, the total flight time T(E) required for an ion to pass through the free-flight region A and the decelerating region B, and be reflected backward in the reflecting region C to eventually return to the original point can be computed by equation (17).

$$T(E)=T_0(U_d+2E)+2T_d(U_d+E,U_d)+T_r(E) \tag{17}$$

As a parameter of the ion optical system independent of the initial conditions of the motion of the ions, a flight-time reference potential $U_0$ is set so that it satisfies $0<U_0\le U_d$. Let $T_s(U_0)$ denote the flight time of an ion whose initial energy is equal to the flight-time reference potential of the ion optical system. This is hereinafter called the standard flight time. Since $U_0\le U_d$, this ion describes a trajectory that turns around at the maximal potential point in the decelerating region B or at one of the points where the potential becomes equal to $U_0$ in the decelerating region B. This flight time can be computed by equation (18).

$$T_s(U_0)=T_0(U_0)+2T_d(U_0,U_0) \tag{18}$$

Suppose that the total flight time of an ion having an initial energy $U_d+E$ and penetrating into the reflecting region C is equal to the standard flight time $T_s(U_0)$, i.e., $T(E)=T_s(U_0)$. This is a conditional equation showing that the total flight time of an on depends solely on the reference potential $U_0$, which is a parameter of the ion optical system, independently of the initial energy of the ion. Under these conditions, the flight time of the ion in the reflecting region C can be derived from equations (17) and (18) as follows:

$$T_r(E)=T_0(U_0)-T_0(U_d+E)+2\{T_d(U_0,U_0)-T_d(U_d+E,U_d)\} \tag{19}$$

The potential distribution function of the reflecting region C for realizing such a flight time can be computed, from equation (12), as expressed by the following equation (20):

$$x(U) = \frac{1}{\pi\sqrt{2m}}\int_0^U \frac{T_r(E)\,dE}{\sqrt{U-E}} \tag{20}$$

As already explained, equation (20) will be given as an algebraic equation if the integral on the right side can be analytically computed. Even if the integral cannot be analytically computed, its numerical value can be obtained by a numerical computation.

Thus, a reflectron having an electrostatic field in which the flight time of an ion is independent of the initial energy thereof can be created by giving the potential distribution of the decelerating region B and the reference potential as a parameter of the ion optical system and then deriving the potential distribution of the reflecting region C by equation (20). As will be explained later, it is preferable to set the reference potential to be equal to the maximal potential in the decelerating region B, i.e. $U_0=U_d$, for convenience of calculation.

Specific examples of the configuration of the ion optical system based on the previously described, generalized technique of designing the electrostatic field of the reflectron in the TOFMS according to the present invention will be hereinafter described.

[1] Configuration Example with Decelerating Region Consisting of One-Stage Uniform Decelerating Electric Field Consider the simplest configuration in which the decelerating region B is a one-stage uniform decelerating electric field having one kind of electric field with a constant field strength, with the reference potential being equal to the maximal potential in the decelerating region B, i.e. $U_0=U_d$. The length of the uniform decelerating electric field can be represented as Ld, where d is the ratio of the length of this electric field to that of the free-flight region A. The potential level of the free-flight region A is defined as zero. If the initial energy of the ion is $U_d+E$, the time required for this ion to pass through the decelerating region B is given by the following equation (21).

$$T_d(U_d+E,\ U_d) = L\frac{d}{U_d}\sqrt{2m/z}\left(\sqrt{U_d+E}-\sqrt{E}\right) \tag{21}$$

In this case, the standard flight time for the reference potential $U_0=U_d$ is:

$$T_s(U_d)=T_0(U_d)+2T_d(U_d,U_d).$$

When the flight time of an ion which turns around in the reflecting region C is equal to the standard flight time, the following equation holds true:

$$T_0(U_d+E)+2T_d(U_d+E,U_d)+T_r(E)=T_0(U_d)+2T_d(U_d,U_d),$$

Accordingly, the flight time in the reflecting region C is given by the following equation (22).

$$T_r(E)=T_0(U_d)-T_0(U_d+E)+2\{T_d(U_d,U_d)-T_d(U_d+E,U_d)\} \tag{22}$$

The shape of the potential in the reflecting region C for realizing this flight time can be calculated from equation (20). In the present case, the integral in equation (20) can be analytically computed, thus yielding the following equation (23).

$$x(U) = \frac{1}{\pi\sqrt{2m}}\int_0^U \frac{T_r(E)\ dE}{\sqrt{U-E}} = \frac{L}{\pi}\left[\pi\ d\frac{U}{U_d}+(1+2d)\sqrt{\frac{U}{U_d}}-\left(1+2d+2d\frac{U}{U_d}\right)\arctan\sqrt{\frac{U}{U_d}}\right] \tag{23}$$

As can be seen in equation (23), the shape of the potential in the reflecting region C is determined by the length L of the free-flight region A, the length d of the decelerating region B and the reference potential value $U_d$ ($=U_0$). In principle, there is no limitation on the ranges of these parameters. Once a designer of the device sets the values of these parameters under various conditions, it is possible to determine, from equation (23), a potential distribution function of the reflecting region C for realizing an energy-independent flight time. That is to say, unlike the conventional cases, there is no need to sacrifice the energy-focusing property for an adequate length of the free-flight region A; an ideal, energy-independent reflectron can be created with high degrees of freedom.

Figure 3:
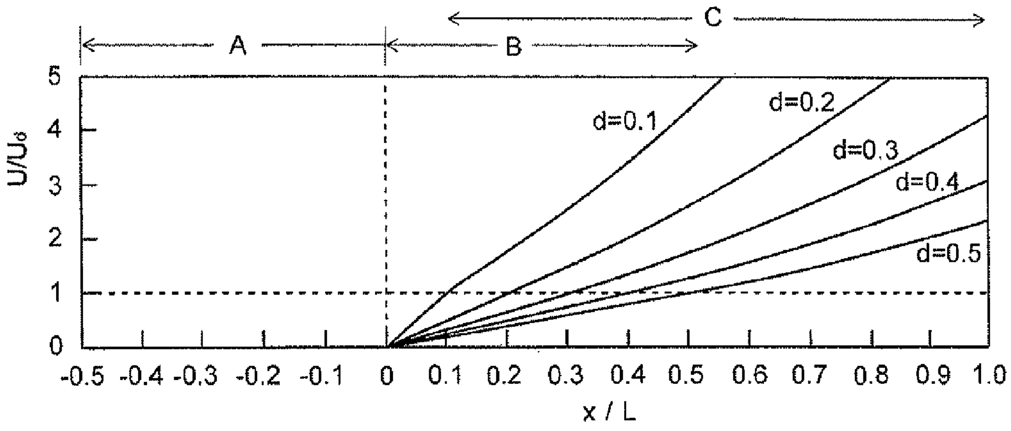
FIG. 3 is a diagram showing the result of a simulation computation of a potential distribution in the decelerating and reflecting regions in the case where a one-stage uniform decelerating electric field is used as the decelerating region in the TOFMS according to the present invention.

FIG. 3 is a diagram showing the results of a simulation computation of the shape of the potential for some parameters in the case where the decelerating region B is a one-stage uniform decelerating electric field. Specifically, those were results obtained by a simulation in which the length of the free-flight region A was divided into the first and second halves of the round trip, and parameter d, i.e. the length of the decelerating region B, was varied from 0.1 to 0.5. In the diagram, the potential is represented as a ratio to the reference potential. The line $U/U_d=1$ indicates the boundary between the decelerating region B and the reflecting region C. For the sake of an implementation of the device, it is preferable that the connection between the potential shapes on both sides of this boundary should be as smooth as possible. Detailed conditions for the ideal connection of the potential at the boundary will be described later.

[2] Configuration Example with Decelerating Region Consisting of Two-Stage Uniform Decelerating Electric Fields When the decelerating region B consists of a one-stage uniform decelerating electric field, the decelerating region B and the reflecting region C will be relatively long. This is unfavorable for the downsizing of the device. As a more practical configuration, the decelerating region may consist of two kinds of uniform decelerating electric fields whose potential distributions differ from each other, as will be hereinafter described.

If $U_1$ denotes the potential due to the uniform decelerating electric field B1 in the first stage of the decelerating region B and $U_2$ denotes the potential due to the uniform decelerating electric field B2 in the second stage, the maximal potential in the entire decelerating region B due to the two-stage uniform decelerating electric fields B1 and B2 is $U_d=U_1+U_2$. Let $Ld_1$ and $Ld_2$ denote the lengths of the two-stage decelerating electric fields B1 and B2, respectively, where $d_1$ and $d_2$ are the ratios of the lengths of the uniform decelerating electric field B1 and B2 to the length of the free-flight region A, respectively. As in the previously described example, consider the case where the reference potential is equal to the maximal potential of the decelerating region B, i.e. $U_0=U_d$, and the potential of the free-flight region A is zero. If the initial energy of the ion is $U_d+E$, the time required for this ion to pass through the first-stage uniform decelerating electric field B1 is given by the following equation (24).

$$T_1(U_d+E) = L\frac{d_1}{U_1}\sqrt{2m/z}\left(\sqrt{U_d+E}-\sqrt{U_2+E}\right) \tag{24}$$

On the other hand, the time required for this ion to pass through the second-stage uniform decelerating electric field B2 is given by the following equation (25), $$T_2(U_d+E) = L\frac{d_2}{U_2}\sqrt{2m/z}\left(\sqrt{U_2+E}-\sqrt{E}\right) \tag{25}$$

The standard flight time for the reference potential $U_d$ ($=U_0$) is given by:

$$T_S(U_d)=T_0(U_d)+2T_1(U_d)+2T_2(U_d).$$

Therefore, when the flight time of an ion which turns around in the reflecting region C is equal to the standard flight time, the flight time in the reflecting region C is expressed by the following equation (26).

$$T_r(E)=T_0(U_d)-T_0(U_d+E)+2\{T_1(U_d)-T_1(U_d+E)\}+2\{T_2(U_d)-T_2(U_d+E)\} \tag{26}$$

The shape of the potential of the reflecting region C which realizes this flight time can be calculated by equation (18). Once again, the integral on the right side of the equation can be analytically computed. The result is as shown by the following equation (27).

$$x(U) = \frac{1}{\pi\sqrt{2m}} \int_0^U \frac{T_r(E)\ dE}{\sqrt{U-E}} = \frac{L}{\pi}\left[\sqrt{\frac{U}{U_d}} - \arctan\sqrt{\frac{U}{U_d}} + 2\frac{d_1}{U_1}\left\{\sqrt{UU_d} - (U+U_d)\arctan\sqrt{\frac{U}{U_d}}\right\} - 2\left(\frac{d_1}{U_1} - \frac{d_2}{U_2}\right)\left\{\sqrt{UU_2} - (U+U_2)\arctan\sqrt{\frac{U}{U_2}}\right\} + \pi\frac{d_2}{U_2}\ U\right] \tag{27}$$

Figure 4:
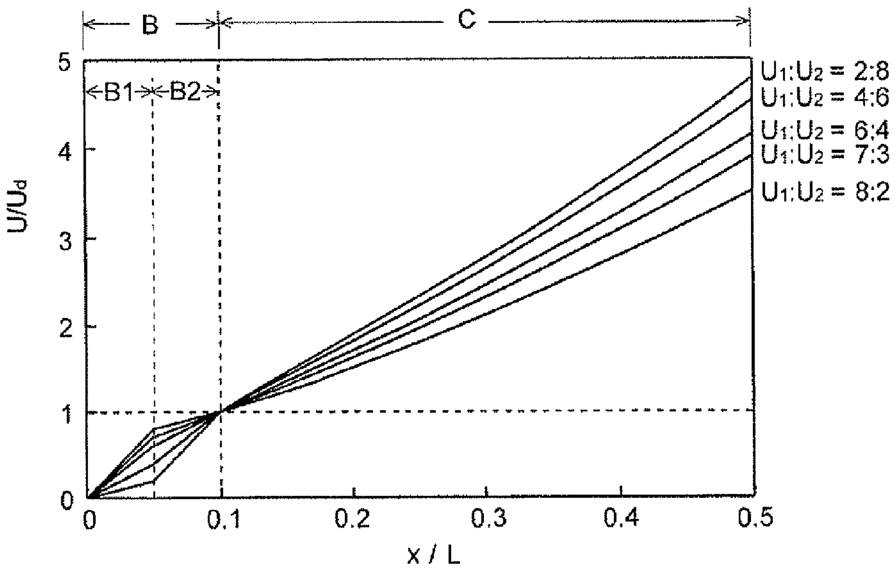
FIG. 4 is a diagram showing the result of a simulation computation of a potential distribution in the decelerating and reflecting regions in the case where two-stage uniform decelerating electric fields are used as the decelerating region in the TOFMS according to the present invention.

Also in this example, it is possible to create an ideal, energy-independent reflectron which has a high degree of freedom in terms of the parameter settings of the ion optical system. As is clear from the comparison of equations (27) and (23), the system in which the decelerating region B consists of the two-stage uniform decelerating electric fields B1 and B2 has more parameters than the system in which the decelerating region B is a one-stage uniform decelerating electric field. This means that the former system has a higher degree of freedom of adjustment. Examples of the shapes of the potential in the present ion optical system are shown in FIG. 4. In these examples, for ease of explanation, the potential ratio between the two-stage uniform decelerating electric fields B1 and B2 is varied while the dimensions $d_1$ and $d_2$ are both assumed to be 0.05. Unlike FIG. 3, the free-flight region A is omitted from FIG. 4; only the shape of the potential covering the two-stage uniform decelerating electric fields B1, B2 and the reflecting region C is shown.

Figure 5:
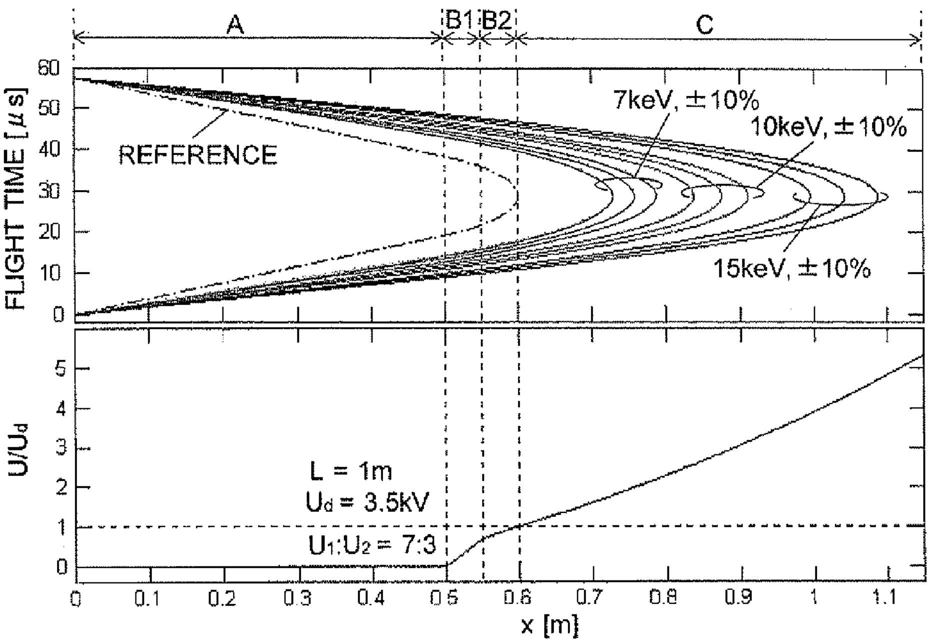
FIG. 5 is a diagram showing the result of a simulation computation of the displacement in the flight time of an ion with respect to a change in the initial energy in the case where two-stage uniform decelerating electric fields are used as the decelerating region in the TOFMS according to the present invention.

To verify the effect of the technique of designing the electrostatic field in the reflectron of the TOFMS according to the present invention, a simulation has been performed to analyze the relationship between the flight time and the displacement of the ion for a plurality of initial energies under the condition that the potential ratio of the first-stage and second-stage uniform decelerating electric fields B1 and B2 is 7:3. The result is shown in FIG. 5. The horizontal axis of the graph in the upper part of this figure indicates the displacement from the starting point, while the vertical axis is the flight time. For reference, the shape of the potential is shown in the lower part of FIG. 5. In the simulation, the free-flight region A was divided into the first and second halves of the round trip, with the total length of 1 m. The reference potential was 3.5 keV. Under these conditions, an on that has been accelerated by a voltage of 3.5 kV or higher penetrates into the reflecting region C, so that the energy dependency of its flight time will be eliminated. The chain line shows the motion of an ion having an initial energy equal to the reference potential. The other curves show the motions of ions with different initial energies. This result confirms that all the ions varying in initial energy return to the starting point at approximately the same point in time. Table 1 shows specific values of the flight time of these ions. In this result, although there is a spread of approximately 0.007 ns in flight time due to the difference in their energy, this is within the range of simulation error. Thus, it has been confirmed that, by the previously described technique, the flight time of the ion becomes always constant independently of the amount of its energy.

TABLE 1

| Initial Energy | Flight Time (μs) |
|---|---|
| 7 keV | 57. 501 420 703 |
| +10% | 57. 501 416 004 |
| −10% | 57. 501 422 587 |
| 10 keV | 57. 501 419 381 |
| +10% | 57. 501 422 799 |
| −10% | 57. 501 418 411 |
| 15 keV | 57. 501 422 956 |
| +10% | 57. 501 416 413 |
| −10% | 57. 501 416 903 |
| 3.5 keV (Reference) | 57. 501 423 523 |

[3] Conditions for Ideal Connection of Electric Field at the Boundary of Decelerating and Reflecting Regions, with Decelerating Region Consisting of Either One-Stage Uniform Decelerating Electric Field or Two-Stage Uniform Decelerating Electric Fields In the ion optical system of the TOFMS according to the present invention, the smoother the connection between the electric field of the decelerating region B and that of the reflecting region C is, the more ideal the electric field created in the actual device will be, which is advantageous for an improvement of the mass-resolving power or other performances. Such a state of connection of the electric field is hereinafter called the "ideal connection of the electric field." The range of parameter d in which the connection of the electric field at the boundary between the decelerating region B and the reflecting region C can be regarded as smooth has already been briefly explained, e.g. in FIG. 3. The following description deals with theoretical conditions for the ideal connection of the electric field. As a premise, it is supposed that an inverse function x(U) of the potential distribution U(x) of the reflecting region C has been given either analytically or by a numerical computation according to the previously described basic principle.

The condition for an electric field to be smoothly connected at the boundary between the decelerating region B and the reflecting region C is that the following two conditions are satisfied at that boundary:

(i) Continuity of the electric field, and (ii) Continuity of the derivative of the electric field.

Condition (i), the continuity of the electric field, can be evaluated on the basis of the first-order differential of the potential, and condition (ii), the continuity of the derivative of the electric field, can be evaluated on the basis of the second-order differential of the electric field. The first-order and second-order differentials of the potential at the boundary as viewed from the reflecting region C can be obtained from the potential inverse function x(U), as expressed by equations (28) and (29), respectively.

$$\frac{dU}{dx} = 1\Big/\frac{dx}{dU} \tag{28}$$

$$\frac{d^2U}{dx^2} = -\frac{d^2x}{dU^2}\Big/\left(\frac{dx}{dU}\right)^3 \tag{29}$$

When the inverse function x(U) of the potential is analytically given, the parameter conditions for the ideal connection of the electric field can be analytically determined from the aforementioned two conditions. If the potential distribution is determined by a numerical computation, a state which satisfies the aforementioned two conditions can be determined by a numerical computation.

As one example, consider the case of determining the parameter condition for the ideal connection of the electric field under the condition that the decelerating region B is a one-stage uniform decelerating field. In this case, the potential distribution function of the reflecting region C is as shown in equation (9). For ease of calculation, this potential inverse function can be rewritten as the following equation (30), using a dimensionless variable $u=U/U_d$.

$$x(u) = \frac{L}{\pi}\left[\pi\, du + (1+2d)\left(\sqrt{u} - \arctan\sqrt{u}\right) - 2du \arctan\sqrt{u}\right] \tag{30}$$

The first-order and second-order differential equations of x(u) with respect to u, which are necessary in the calculation, are given by equations (31) and (32), respectively.

$$\frac{dx}{du} = \frac{L}{\pi}\left[\pi\, d + \frac{\sqrt{u}}{2(1+u)} - 2d \arctan\sqrt{u}\right] \tag{31}$$

$$\frac{d^2x}{du^2} = \frac{L}{\pi}\left[\frac{\sqrt{u}}{2\,(1+u)^2} + \frac{1-4d}{4\sqrt{u}\,(1+u)}\right] \tag{32}$$

The value at the boundary between the decelerating region B and the reflecting region C can be obtained by using u=0. Accordingly, the field strength U'(0) at the boundary viewed from the reflecting region C is given by the following equation (33).

$$U'(0) = U_d \Big/ \left(\frac{dx}{dU}\right)_{u=0} = \frac{U}{Ld} \tag{33}$$

When the boundary is viewed from the decelerating region B, the electric field existing on the near side thereof is a uniform decelerating electric field, so that the field strength at the boundary is U/Ld. This is equal to the value viewed from the reflecting region C; i.e., the condition for the continuity of the electric field at the boundary between the decelerating region B and the reflecting region C is satisfied in the present case.

Subsequently, the condition for the continuity of the derivative of the electric field is determined. When the boundary is viewed from the decelerating region B, the electric field on the near side thereof is a uniform decelerating electric field, so that the derivative of the electric field at the boundary is zero. Accordingly, for the ideal connection of the electric field, the derivative of the electric field at the boundary viewed from the reflecting region C only needs to be zero. From equation (29), it can be understood that the derivative of the electric field at the boundary viewed from the reflecting region C will be zero when $d^2x/du^2=0$. From equation (32), this condition holds true for u=0 when:

$$d=1/4=0.25.$$

Thus, it has been found that, when the decelerating electric field B is a one-stage uniform decelerating electric field, the parameter condition for the ideal connection of the electric field is d=0.25.

Next, the problem of determining the parameter condition for the ideal connection of the electric field in the case where the decelerating region B consists of two-stage uniform decelerating fields is hereinafter discussed. In this case, the potential distribution function of the reflecting region C is as shown in equation (3). As in the previously described case of the one-stage uniform decelerating field, for ease of calculation, the equation of the potential inverse function can be rewritten as expressed by equation (34), using the dimensionless variables and parameters $u=U/U_d$, $u_1=U_1/U_d$ and $u_2=U_2/U_d$.

$$x(u) = \frac{L}{\pi}\left[\pi\, d\frac{u}{u_2} + \sqrt{u} - \arctan\sqrt{u} + 2\frac{d}{1-u_2}\left\{\sqrt{u} - (u+1)\arctan\sqrt{u}\right\} - 2d\frac{2u_2-1}{u_2(1-u_2)}\left\{\sqrt{uu_2} - (u+u_2)\arctan\sqrt{\frac{u}{u_2}}\right\}\right] \tag{34}$$

In this equation, the condition $d=d_1=d_2$ was used to simplify the ion optical system. The condition of $u_1=1-u_2$, which is known from the definition, was also used. By a calculation similar to the one used in the previous case of the one-stage uniform decelerating electric field, the parameter condition for the ideal connection of magnetic field can be determined as follows.

$$d = \frac{u_2^{3/2}\left(\sqrt{u_2}+1\right)}{4\left(\sqrt{u_2} - u_2 + 1\right)} \tag{35}$$

The conditions for the ideal connection of the electric field can also be determined by similar calculations even in the case where the configuration or other elements of the decelerating region B is changed in a manner to be described later.

Figure 6:
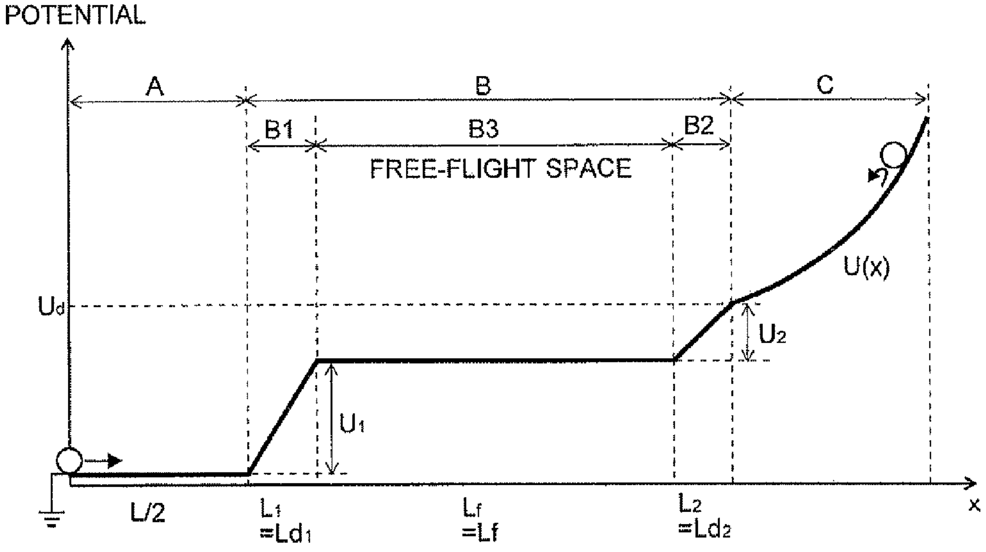
FIG. 6 is a schematic diagram of a potential distribution in the flight space of the TOFMS according to the present invention in the case where the decelerating region consists of two-stage uniform decelerating electric fields with an auxiliary free space separating the two electric fields.

[4] Configuration Example with Free-Flight Region between Two-Stage Uniform Decelerating Electric Fields Which Constitute the Decelerating Region As already noted, a field-free section or an accelerating electric field may be partially provided in the decelerating region B. One example of such a configuration is hereinafter described, in which the decelerating region B consists of an intermediate free-flight space B3 and two uniform decelerating electric fields B1 and B2 separated by the free-flight space B3. The parameters of the ion optical system in this example are as shown in FIG. 6. Similar to the previously described examples which does not have the free-flight space B3, $U_1$ is the potential due to the first-stage uniform decelerating electric field B1, and $U_2$ is the potential due to the second-stage uniform decelerating electric field B2. $Ld_1$ and $Ld_2$ are the lengths of the two uniform decelerating electric fields B1 and B2, respectively. Additionally, the length of the free-flight space B3 is similarly expressed as Lf, where f is the ratio of this length to the length of the free-flight region A.

Based on the previously described principle of the TOFMS according to the present invention, the potential distribution in the reflecting region C can be analytically determined, as expressed by the following equation (36).

$$x(u) = \frac{L}{\pi}\left[\pi\, d_2\frac{u}{u_2} + \sqrt{u} - \arctan\sqrt{u} + 2\frac{d_1}{u_1}\left\{\sqrt{u} - (u+1)\arctan\sqrt{u}\right\} + 2f\left\{\sqrt{\frac{u}{u_2}} - \arctan\sqrt{\frac{u}{u_2}}\right\} - \right. \tag{36}$$

-continued $$2\left(\frac{d_1}{u_1}-\frac{d_2}{u_2}\right)\left\{\sqrt{uu_2}-(u+u_2)\arctan\sqrt{\frac{u}{u_2}}\right\}\Bigg]$$

Similar to the foregoing examples, the variables and parameters in this equation are represented in dimensionless forms. Taking into account the fact that this equation contains too many parameters and is complex, let us suppose that $d=d_1=d_2$, which means that the two uniform decelerating electric fields B1 and B2 have the same length. Then, equation (36) will be rewritten as equation (37).

$$x(u)=\frac{L}{\pi}\Bigg[\pi\ d_2\frac{u}{u_2}+\sqrt{u}-\arctan\sqrt{u}+2\frac{d}{1-u_2}\{\sqrt{u}-(u+1)\arctan\sqrt{u}\}+2f\left\{\sqrt{\frac{u}{u_2}}-\arctan\sqrt{\frac{u}{u_2}}\right\}-2d\frac{2u_2-1}{u_2(1-u_2)}\left\{\sqrt{uu_2}-(u+u_2)\arctan\sqrt{\frac{u}{u_2}}\right\}\Bigg] \tag{37}$$

The parameter condition for the ideal connection of the electric field in the present case is as follows.

$$d=\frac{(2f+u_2^{3/2})(\sqrt{u_2}+1)}{4(\sqrt{u_2}-u_2+1)} \tag{38}$$

In the present case, ions fly through the free-flight space B3 after being decelerated by the first-stage decelerating electric field B1. Such a configuration is advantageous for realizing a small yet high-resolution system since the flight time of the ion can be elongated without increasing the device size.

Figure 7:
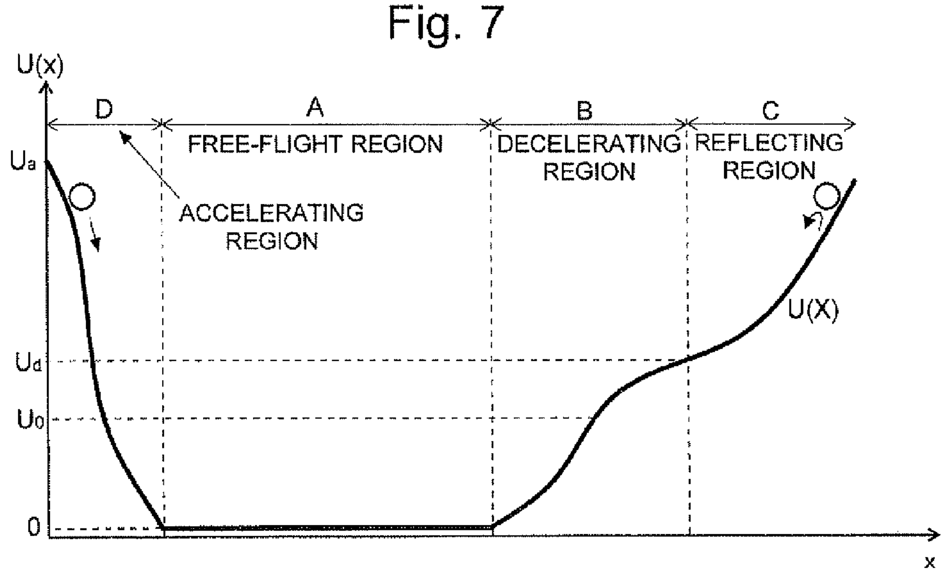
FIG. 7 is a schematic diagram of a potential distribution in the flight space including an accelerating potential in the TOFMS according to the present invention.

[5] Example in which an Accelerating Potential Distribution for Making Ions Fly is Also Considered The foregoing descriptions are based on the premise that an ion which has been given a certain amount of energy from an ion source or similar device is introduced into the flight space including the reflectron. Additionally, an accelerating potential distribution within a region where an ion is supplied with energy may also be considered in the determination of the potential distribution of the reflecting region C. A variation in the flight time of the ion similarly occurs in the ion-accelerating region. As schematically shown in FIG. 7, by taking into account the distribution of the ion-accelerating potential within the accelerating region D, it is possible to derive a potential distribution which can eliminate the energy dependency of the flight time required for an ion to fly through the entire ion optical system inclusive of the accelerating region D.

Figure 8:
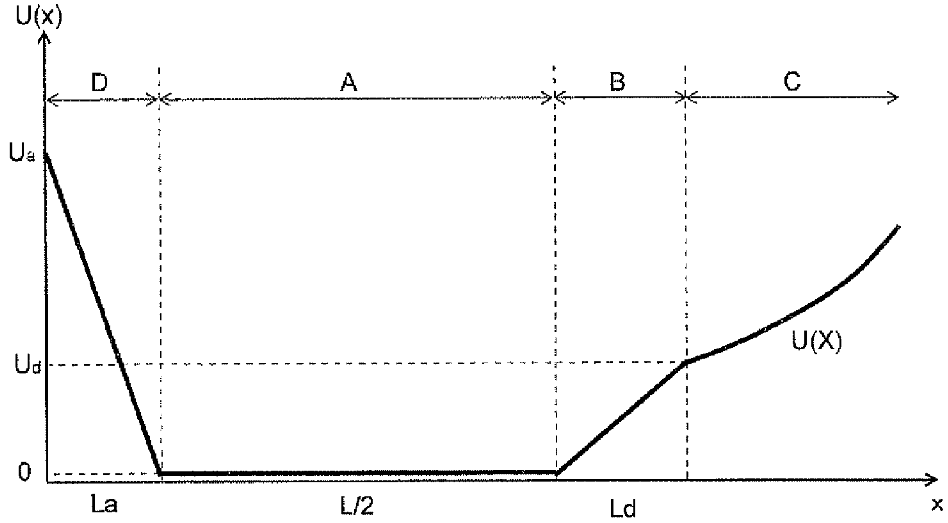
FIG. 8 is a diagram showing a potential distribution in the TOFMS according to the present invention in the case where the accelerating region is a uniform accelerating electric field and the decelerating region is a one-stage uniform decelerating electric field.

Initially, consider the case where the potential distribution of the accelerating region D is a one-stage uniform accelerating electric field, and the decelerating region B is a uniform decelerating electric field. A shape of this potential distribution is shown in FIG. 8. The length of the accelerating region D expressed as La, where a is the ratio of this length to the length of the free-flight region A. The maximal potential in the accelerating region D is $U_a$. The other parameters are the same as those used in the foregoing examples. Based on the previously described principle of the TOFMS according to the present invention, the potential distribution in the reflecting region C can be analytically determined, as expressed by the following equation (39), where, similar to the foregoing examples, the variables and parameters are represented in dimensionless forms: $u=U/U_d$ and $u_a=U_a/U_d$.

$$x(u)=\frac{L}{\pi}\left[\pi\ du+\sqrt{u}-\arctan\sqrt{u}+\left(\frac{a}{u_a}+2d\right)\{\sqrt{u}-(u+1)\arctan\sqrt{u}\}\right] \tag{39}$$

The parameter condition for the ideal connection of the electric field in the present case is as follows.

$$4d=1-(2a/u_a) \tag{40}$$

Figure 9:
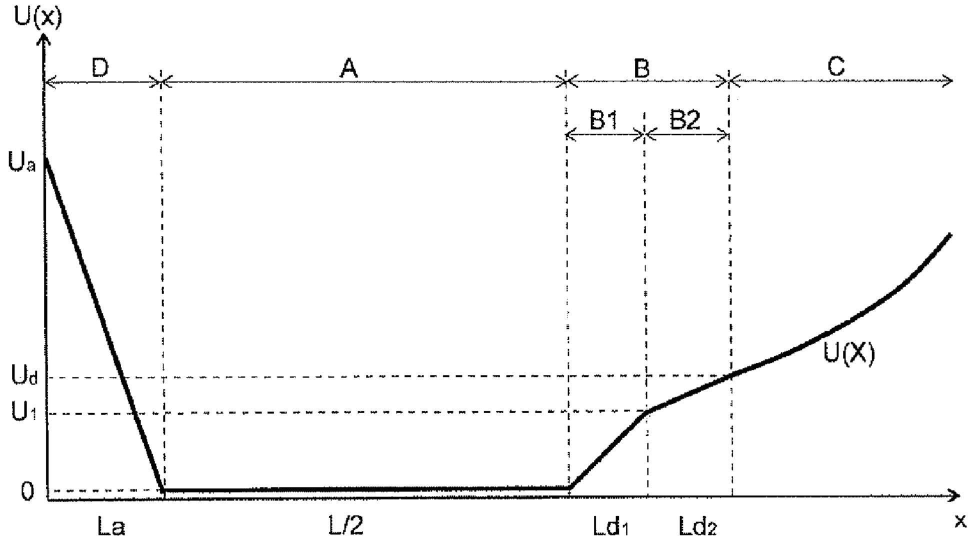
FIG. 9 is a diagram showing a potential distribution in the TOFMS according to the present invention in the case where the accelerating region is a uniform accelerating electric field and the decelerating region consists of two-stage uniform decelerating electric fields.

Next, consider the case where the potential distribution of the accelerating region D is a one-stage uniform accelerating electric field while the decelerating region B consists of two-stage uniform decelerating electric fields B1 and B2. A shape of this potential distribution is shown in FIG. 9. The parameters are the same as those used in the foregoing examples. Based on the previously described principle of the TOFMS according to the present invention, the potential distribution in the reflecting region C can be analytically determined, as expressed by the following equation (41), where, similar to the foregoing examples, the variables and parameters are represented in dimensionless forms.

$$x(u)=\frac{L}{\pi}\Bigg[\pi\ \frac{d_2}{u_2}u+\sqrt{u}-\arctan\sqrt{u}+\left(\frac{a}{u_a}+2\frac{d_1}{u_1}\right)\{\sqrt{u}-(u+1)\arctan\sqrt{u}\}-2\left(\frac{d_1}{u_1}-\frac{d_2}{u_2}\right)\left\{\sqrt{uu_2}-(u+u_2)\arctan\sqrt{\frac{u}{u_2}}\right\}\Bigg] \tag{41}$$

The parameter condition for the ideal connection of the electric field in the present case is as follows.

$$4d\frac{\sqrt{u_2}\cdot u_2+1}{u_2^{3/2}(\sqrt{u_2}+1)}=1-\frac{2a}{u_a} \tag{42}$$

In the foregoing examples, the decelerating region B was assumed to be either a one-stage uniform decelerating electric field or two-stage uniform decelerating electric fields. It is evident that the aforementioned result, i.e. the equalization of the flight time of the ions independent of the difference in their energies, can be similarly obtained by applying the same technique as long as the electric field of the decelerating region B satisfies the previously described conditions.

[6] Estimation of Allowable Discrepancy of Potential Distribution

By the previously described technique of designing the electrostatic field of the reflectron, it is possible to create an ideal reflectron in which the flight time of the ions having the same mass-to-charge ratio is independent of the energy of each ion. Furthermore, as already noted, the potential distribution of the decelerating region B (and that of the accelerating region D) can be arbitrarily given by the designer, and for the given potential distribution of the decelerating region B (and that of the accelerating region D), the potential distribution of the reflecting region C can always be determined in the form of either an analytic formula or a numerical solution obtained by a numerical computation. A reasonably implementable potential distribution can be determined by choosing appropriate parameters taking into account the smoothness of the connection of the electric field at the boundary between the decelerating region B and the reflecting region C in the previously described manner.

However, creating a potential distribution that exactly matches an intended form is normally difficult for an actual device. This is because actual devices have only a limited number of electrodes to which voltages can be applied to create an electrostatic field exhibiting a desired potential distribution, and furthermore, it is impossible to completely eliminate mechanical errors in the shape, arrangement and other aspects of the electrodes, as well as an error or fluctuation in the voltages applied to them. That is to say, an actually created potential distribution will inevitably have a certain extent of discrepancy from the intended potential distribution determined analytically or by another method. Accordingly, to estimate the extent to which the discrepancy is allowed, a simulation computation has been conducted to determine the relationship between a voltage change from the voltage applied under ideal conditions and the resultant TOF peaks.

Figure 12:
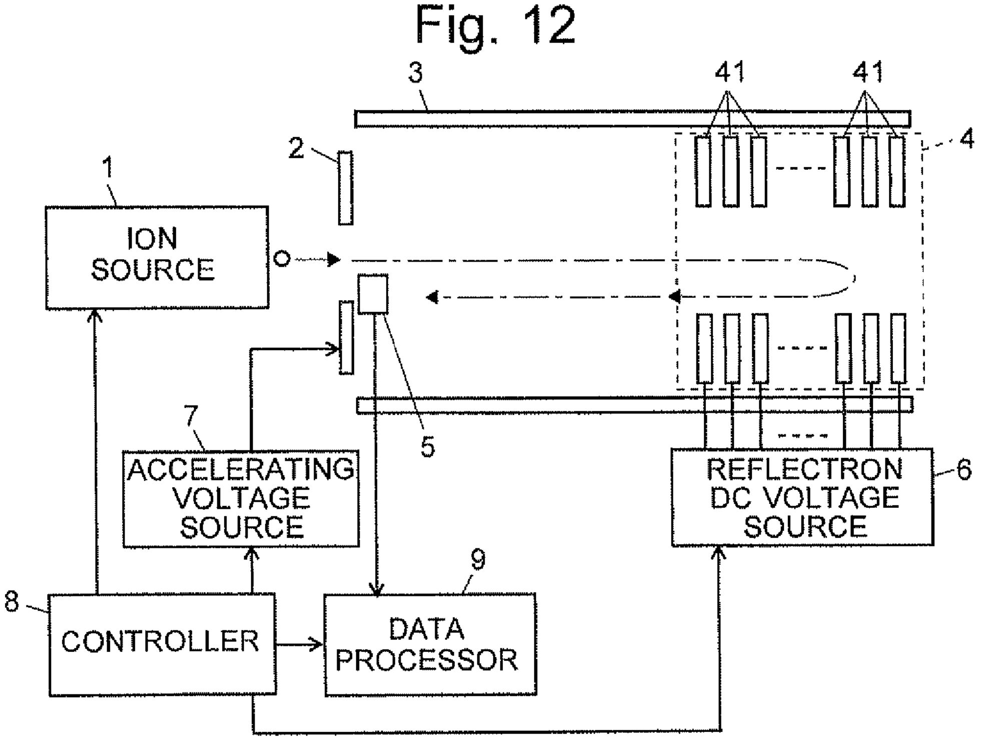
FIG. 12 is a schematic configuration diagram of a TOFMS according to one embodiment of the present invention.
Figure 13:
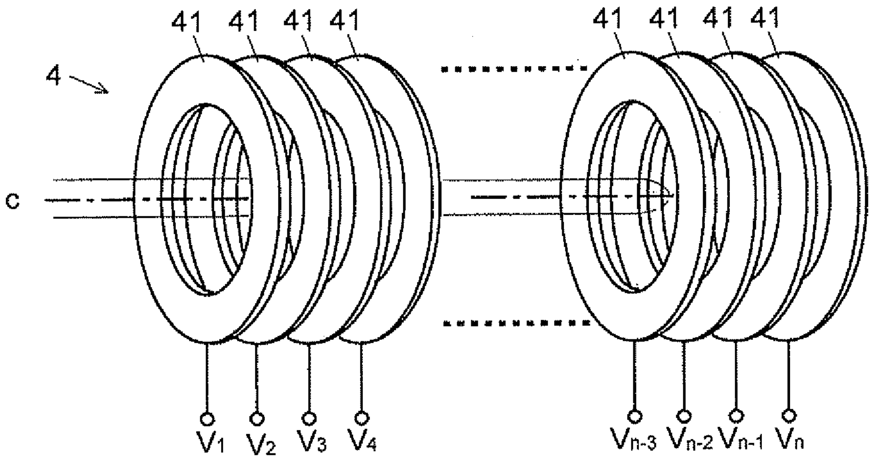
FIG. 13 is a schematic perspective view showing the structure of the reflectron in the TOFMS of the present embodiment.

In the ion optical system used for the simulation includes no accelerating region D, and the decelerating region B consists of two-stage uniform decelerating electric fields. The reflectron consists of a plurality of electrodes as shown in FIGS. 12 and 13, which will be described later. This reflectron is divided into the "front section" and "rear section", which are separated by an electrode located at the boundary between the first-stage decelerating region B1 and the second-stage decelerating region B2, the front section extending from the first electrode at the inlet of the reflectron to the electrode at the aforementioned boundary, and the rear section consisting of all the other, subsequent electrodes (including the reflecting region C). It is supposed that optimal voltages to be applied in each of the front and rear sections have been determined by theoretical calculation or simulation, and the relative ratios of the voltages applied to the electrodes have been computed for each section.

Figure 10:
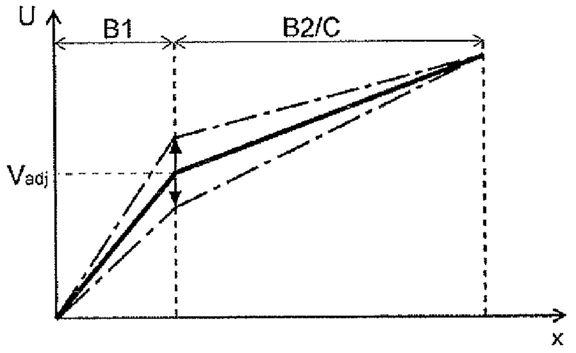
FIG. 10 is a diagram showing a potential distribution observed when the voltage at the boundary between the first-stage and second-stage decelerating electric fields is changed in the case where the decelerating region consists of two-stage uniform decelerating electric fields.
Figure 11:
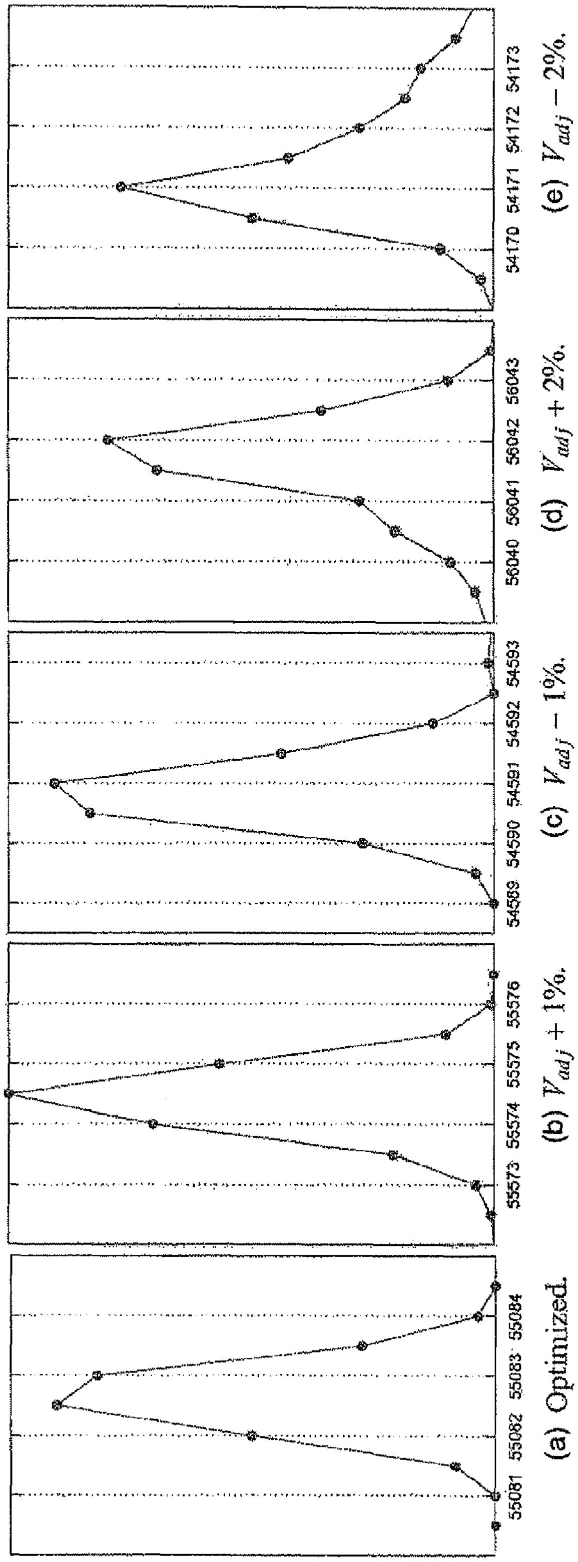
FIG. 11 is a diagram showing the result of a simulation of the TOF peak waveform for the change in the voltage shown in FIG. 10.

Now, consider the case shown in FIG. 10 where the voltage value $V_{adj}$ at the boundary between the first-stage decelerating electric field B1 and the second-stage decelerating electric field B2 is varied from an ideal level, while the voltage applied to the foremost electrode in the front section (i.e. the voltage value at the inlet end of the first-stage decelerating electric field B1) and the voltage applied to the rearmost electrode in the rear section (i.e. the voltage value at the rear end of the reflecting region C) are virtually fixed. During this voltage variation, the voltage values are regulated so as to maintain their relative ratios in each of the front and rear sections. FIG. 11 shows TOF peaks obtained by the simulation under the condition that the voltage $V_{adj}$ was set at the optimal level, or changed from the optimal level by ±1%, or changed from the optimal level by ±2%.

FIG. 11 shows that the peaks obtained under the ±1% changes are roughly of the same shape as that of the peak obtained at the optimal level. In the case of the ±2% changes, although the slope shape of the peak is slightly degraded, the full width at half maximum (FWHM) of the peak is maintained at approximately the same as the value obtained at the optimal level. These results suggest that even a 5% displacement from the theoretically determined optimal value will be allowable as far as the device performance determined by the FWHM of the peak is concerned, such as the mass-resolving power. The above result obtained under the condition that the change in the potential distribution changes was caused by changing the voltage at the boundary of the two-stage uniform decelerating electric fields can also be expanded to the case where the potential distribution in the decelerating region B or reflecting region Cis displaced from a theoretically determined potential distribution. For example, although the potential distribution of the reflecting region C will theoretically have a curved shape, the maximal displacement of this curve from a straight line can be considerably reduced depending on the way of choosing the parameters. If this maximal displacement is within the previously described allowable range of displacement of the potential distribution, the potential distribution in the reflecting region C can be linearly approximated, which is advantageous for realizing a simpler, less expensive construction of the device.

EMBODIMENT

One embodiment of the TOFMS according to the present invention based on the previously described principle and examples of the specific configuration of the reflectron used in the TOFMS are hereinafter described. FIG. 12 is a schematic configuration diagram of the TOFMS according to the present embodiment, and FIG. 13 is a schematic perspective view of a reflectron 4 shown in FIG. 12.

In FIG. 12, ions produced from a sample in an ion source 1 are given an amount of initial energy from an electric field created by a voltage applied from an accelerating voltage source 7 to an accelerating electrode 2, to be injected into a flight space formed within a flight tube 3. The flight tuber contains a reflectron 4 consisting of a plurality of electrodes. Each ion is decelerated and reflected by an electric field created by the reflectron 4. The reflected ions fly backward and arrive at a detector 5, which produces a detection signal corresponding to the amount of the incoming ions. A reflectron DC voltage source 6 applies a predetermined voltage to each of the electrodes constituting the reflectron 4, whereby an electrostatic field (DC electric field) having a predetermined potential shape is created within the space inside the reflectron 4. The ion source 1, accelerating voltage source 7, reflectron DC voltage source 6 and other components are individually controlled by a controller 8. A data processor 9 receives information about the timing of accelerating ions, i.e. information about the time of departure of ions, from the controller 8. With reference to this information, it measures the flight time of each ion based on the detection signal of the ion concerned, and converts the flight times into mass-to-charge ratios m/z to create a mass spectrum.

As shown in FIG. 13, the reflectron 4 consists of a plurality (n pieces) of ring electrodes 41 arranged along the central axis c. When the DC voltages $V_1, V_2, \ldots, V_n$ applied from the reflectron DC voltage source 6 to the ring electrodes 41 are set to the predetermined values, a decelerating region B having one or more kinds of potential distributions and a reflecting region C having a curved potential distribution are created along the central axis c within the space surrounded by the ring electrodes 41, whereby a reflectron in which the energy dependency of the flight time is eliminated is realized. Once the dimensions and arrangement of the ring electrodes 41 constituting the reflectron 4 have been determined, the voltages to be applied to the ring electrodes 41 and the thereby created potential distribution can be determined by a simulation computation (by an analytic formula or numerical computation). Accordingly, after a desired potential distribution has been determined in the previously described manner, the voltage values for realizing that potential can be calculated beforehand, i.e. at the stage of designing the device.

Each of the ring electrodes 41 constituting the reflectron 4 only needs to have a structure that surrounds one space as a whole, and its specific structure is not limited to this one. That is to say, when viewed from the central axis c, the opening does not need to be shaped circular, but may have any other shape, such as an ellipse, square or polygon. Furthermore, one ring electrode may be composed of a plurality of segment electrodes.

Instead of applying a voltage with an independently adjustable value from the reflectron DC voltage source 6 to each ring electrode 41 as shown in FIG. 13, a series of voltages produced by resistive division using a ladder resistive circuit or similar element may be respectively applied to the ring electrodes 41. In that case, it is natural that the voltage applied to each ring electrode can be controlled by adjusting each resistance value of the ladder resistive circuit used for the resistive division. However, to simplify the structure while ensuring a high performance, it is desirable to equalize the resistance values of the plurality of resistors constituting the ladder resistive circuit. If the potential distribution has a linear shape, the ladder resistive circuit using a plurality of resistors having the same value can be easily used. That is to say, a uniform decelerating electric field can be created by using a ladder resistive circuit composed of resistors of the same value in such a manner that a series of voltages are produced by resistive division and respectively applied to a plurality of electrodes arranged at regular intervals. On the other hand, when a curved potential distribution needs to be created in the reflecting region C, it is possible to use a ladder resistive circuit having resistors of the same value to produce a series of voltages by resistive division and respectively apply those voltages to a plurality of electrodes whose intervals are not regular but have been appropriately adjusted. If, as explained earlier, the potential distribution in the reflecting region C can be linearly approximated, the voltages produced by the ladder resistive circuit having resistors of the same value can be respectively applied to the electrodes without adjusting their intervals individually (but arranging them at regular intervals). Thus, by using a ladder resistive circuit, it is possible to simplify the reflectron DC voltage source 6 and reduce its cost.

Figure 14:
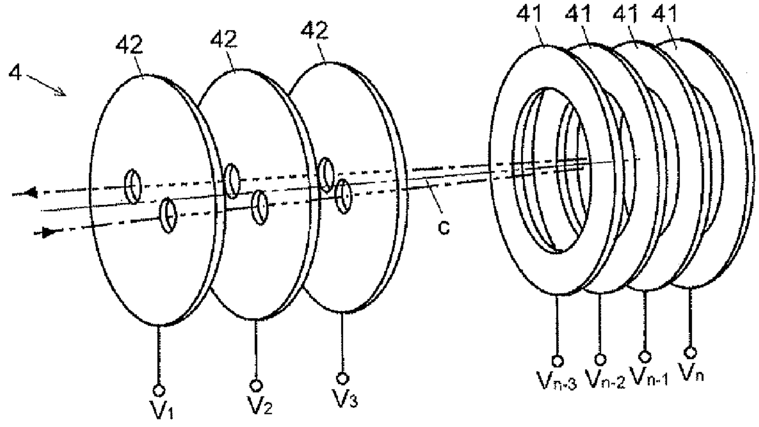
FIG. 14 is a schematic perspective view showing another example of the structure of the reflectron.

Hereinafter described is an effective method for adjusting the voltage values in the case where, as shown in FIG. 13 or 14, the reflectron 4 consists of a plurality of electrodes, the decelerating region B consists of two-stage uniform decelerating electric fields, and the condition for the ideal connection of the electric field as expressed by equation (35) is satisfied. The following discussion is premised on the previously described configurations; i.e. one electrode exists at the boundary between the first-stage uniform decelerating electric field B1 and the second-stage uniform decelerating electric field B2; this electrode separates the front section (the uniform decelerating electric field B1) on the inlet side and the rear section (the uniform decelerating electric field B2 and the reflecting region C) on the outlet side; optimal voltages to be applied to the electrodes in each of these sections have been obtained by theoretical calculation or simulation; and the relative ratios of the voltages applied to the electrodes have been computed for each section.

In an actual device, if the voltage value of each of the electrodes is slightly varied without changing the relative ratios of the voltages applied to the electrodes in each of the front and rear sections, the position of the detector 5 at which the FWHM of the observed TOF peak is minimized (i.e. at which the temporal dispersion of ions having the same mass-to-charge ratio is minimized) will change, provided that the starting point of the ion (the position of the accelerating electrode 2) is fixed. Theoretically, the operation of varying the voltage values while maintaining the relative ratios of the voltages means changing the speed reduction ratio $u_1$ or $u_2$ of the first-stage or second-stage uniform decelerating electric field B1 or B2. Varying the voltage values while maintaining the relative ratios of the voltages is easy to achieve in the case where the voltages are produced by a ladder resistive circuit and respectively applied to the electrodes.

When equation (35) defining the condition for the ideal connection of the electric field holds true, a change of $u_1$ or $u_2$ means a change of dimensionless parameter d which gives the length of the decelerating electric field. In actual devices, since the real length of the decelerating electric field, which is expressed as Ld using the aforementioned parameter d and the length L of the free-flight region A, is fixed, the change of d occurs under the condition that Ld is constant, which substantially means a change of L. If the starting point of the ions is fixed, this change in the length L of the free-flight region A leads to a change in the theoretically optimal position of the detection surface. Needless to say, in actual devices, once the detector 5 is mounted in the device, not only the starting point of the ions but also the detection surface becomes fixed. Accordingly, the aforementioned change in the voltages applied to the electrodes eventually causes a change in the full width at half maximum (FWHM) of the TOF peak. This suggests that the FWHM of the TOF peak can be minimized by appropriately adjusting the voltages applied to the electrodes. In particular, when a ladder resistive circuit is used, the performance can be improved by merely adjusting one or a small number of voltage values. This is significantly advantageous for simplifying the device tuning process aimed at compensating for performance degradations which inevitably occur in actual devices due to various factors, such as a variation in the machining or assembly of the electrodes and other parts or a variation in the values of the applied voltages.

As for the position and direction of the injection of ions with respect to the reflectron 4, ions may be injected on and along the central axis e so that their forward and backward paths lie on the same straight line. Alternatively, ions may be injected at an angle to the central axis e so that their forward and backward paths will not overlap each other.

FIG. 14 shows another configuration example of the reflectron 4. In this reflectron 4, plate electrodes 42 having ion-passing holes are provided at the boundary of a uniform decelerating electric field to create the decelerating region B, while the reflecting region C is formed by a plurality of ring electrodes 41. The decelerating region B consists of one or more kinds of uniform decelerating electric fields. In the reflecting region C, an electric field having a curved potential shape, which has been appropriately derived for the potential shape of the decelerating region B, is created. By making the ion-passing holes of the plate electrodes 42 as small as the width of the ion beam, a uniform electric field can be created between the neighboring plate electrodes 42. In the present example, each plate electrode 42 has two holes, one for the forward path and the other for the backward path, which are located at predetermined positions so that ions will be injected at an angle to the central axis c and follow different paths in their forward and backward motions. The position and shape of each hole can be determined by an ion-trajectory simulation. Instead of boring two holes in the plate electrode 42, it is possible to form one hole whose shape and size are sufficiently designed to allow both the forward and backward passages of the ions on different paths. If the ions are injected parallel to the central axis e and follow the same path in both forward and backward motions, it is only necessary to provide each plate electrode 42 with one hole that allows both the forward and backward passages of the ions. A ring electrode may be added between the neighboring plate electrodes 42 to improve the degree of uniformity of the electric field.

Figure 15:
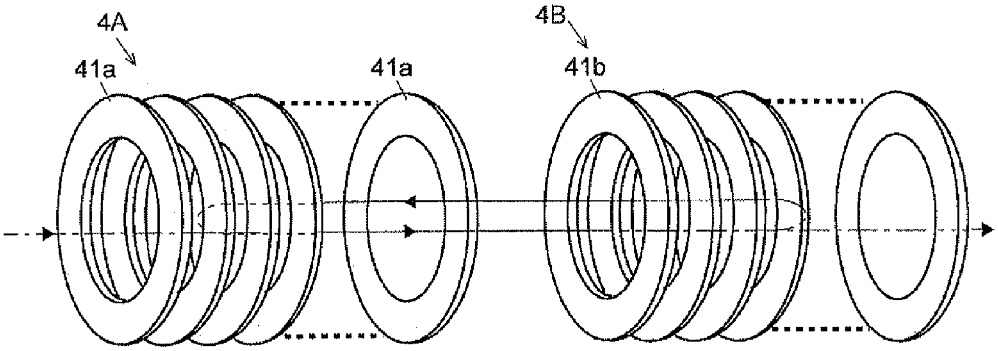
FIG. 15 is a schematic perspective view showing the structure of the reflectron in a TOFMS according to another embodiment.

The TOFMS of the above embodiment is designed to detect ions after making them fly through a round-trip path by using a reflectron having the previously described characteristic configuration. Instead of such a simple reflection type, the present invention may be embodied in the form of a multi-reflection type TOFMS using a pair of reflectrons, each of which has the previously described configuration, to make ions fly back and forth multiple times. FIG. 15 is a schematic diagram of the flight space in a multi-reflection system including two reflectrons. Each of the two reflectrons 4A and 4B shown in FIG. 15 corresponds to the reflectron 4 shown in FIG. 13. The two reflectrons 4A and 4B are placed oppose to each other so that the boundary planes of the free-flight regions A on the sides not in contact with the decelerating regions B coincide with each other. Ions are introduced from outside one of the reflectrons 4A and 413 along the central axis c into the reflectrons 4A, 4B and the space between them.

In the configuration example of FIG. 15, ions are introduced from outside the reflectron 4A (from the left side in FIG. 15) along the central axis c. In this operation, each of the voltages applied to the ring electrodes 41*a* of the reflectron 4A on the ion-introduction side is adjusted to either a reference ground potential or a value which has been adjusted so as to create an electric field suitable for the introduction of ions. This state of the voltages applied to the ring electrodes 41*a* is hereinafter described as "OFF." Before the ions introduced into and reflected by the other reflectron 4B enter the decelerating region B of the reflectron 4A on the ion-introduction side, predetermined voltages for enabling the ion-introducing reflectron 4A to function as a previously-described energy-independent reflectron are respectively applied to the ring electrodes 41*a* of the ion-introducing reflectron 4A so that this reflectron 4A will also reflect the ions. This state of the voltages applied to the ring electrodes 41*a* is hereinafter described as "ON." By making the ions fly back and forth between the two reflectrons 4A and 4B in this manner, this system substantially traps the ions within the flight space.

When the ions which have completed the reciprocal motions a predetermined number of times are to be extracted, the other reflectron 4B opposing the ion-introduction side is used as the ion-ejection side. That is to say, at a predetermined timing, each of the voltages applied to the ring electrodes 41*b* of the reflectron 4B on the ion-ejection side is switched to either the reference ground potential or a value which has been adjusted so as to create an electric field suitable for the ejection of ions (i.e. the ring electrodes 41*b* are changed to the "OFF" state), thereby ejecting the ions to the outside of the flight space as indicated by the arrow in FIG. 15 (toward the right side in FIG. 15). Then, for example, the ions are detected by an external detector (not shown). With such a multi-reflection system, it is also possible to selectively eject the ions having a specific mass-to-charge ratio by regulating the timing and/or interval of the ON/OFF operation of the ion-ejecting reflectron 4B.

Figure 16:
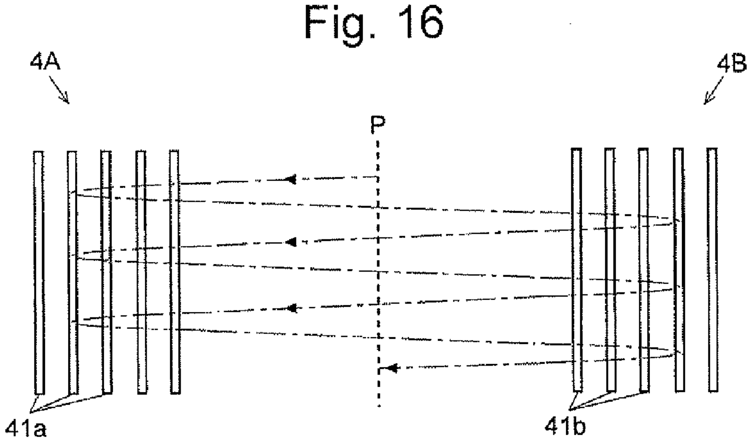
FIG. 16 is a schematic side view showing another example of the ion path in the TOFMS having the configuration of FIG. 15.

In the configuration shown in FIG. 15, ions make the reciprocal motion along roughly the same path between the two reflectrons 4A and 4B opposing each other. It is also possible to multi-reflect ions in such a manner that their forward and backward paths do not overlap each other. FIG. 16, shows one example of such a path of ions. In FIG. 16, the dash line P indicates the boundary plane between the free-flight spaces A on the sides not in contact with from the decelerating regions B in the two reflectrons 4A and 4B. In this configuration, the ion gradually changes its position in the direction perpendicular to the central axis of the reflectrons 4A and 4B for every reciprocal motion. The number of repetitions of the reciprocal motion, and hence the flight distance, is determined by the angle to the central axis at which ions are injected into the reflectron 4A on the ion-introduction side.

In any of the configurations shown in FIGS. 15 and 16, a lens or similar ion optical element for suppressing dissipation of the ions' trajectory may be inserted in the free-flight region A. The multi-reflection system as shown in FIG. 16 can also be realized by using two reflectrons having the configuration shown as in FIG. 14.

In the case of the multi-reflection system using the two reflectrons 4A and 4B shown in FIG. 15, a non-destructive ion detector may be placed in the free-flight region A between the reflectrons 4A and 4B to observe the intensity of the passing ions in a non-destructive way and perform a mass spectrometry by analyzing the observation signal by a Fourier transform or other methods to determine the motion period of each of the ions having different mass-to-charge ratios.

It is also possible to externally perform various operations on the ions flying through the free-flight region sandwiched between the two reflectrons 4A and 4B. For example, an electron beam which intersects with the flight path of the ions may be directed at a portion of the free-flight region A between the two reflectrons 4A and 4B so as to cause electron capture dissociation of the ions by the effect of the electron beam, thus generating product ions, and let these product ions fly further to be subjected to a mass spectrometry. Similarly, a reactive ion beam which intersects with the flight path of the ions may be directed at a portion of the free-flight region A between the two reflectrons 4A and 4B so as to cause electron transfer dissociation of the ions by the effect of the ion beam, thus generating product ions, and let these product ions fly further to be subjected to a mass spectrometry.

In the embodiment of the TOFMS shown in FIG. 12, no specific mention is made about the type of the ion source 1. For example, when the sample to be analyzed is a solid sample or powder sample, a MALDI (matrix-assisted laser desorption ionization) ion source or an LDI ion source (which does not use any matrix) is available as the ion source 1. For a gaseous sample, an EI (electron ionization) or CI (chemical ionization) ion source may be used as the ion source 1, in which case a gas chromatograph may be connected in the previous stage of the TOFMS to create a GC-MS system. If the sample is a liquid sample, the ion source 1 is a so-called atmospheric pressure ion source, such as an ESI (electrospray ionization), APCI (atmospheric pressure chemical ionization) or APPI (atmospheric pressure photoionization) ion source, in which case a liquid chromatograph may be connected in the previous stage of the TOFMS to create an LC-MS system.

Whatever type the ion source is, a system can be created in which ions extracted from the ion source are temporarily captured in a three-dimensional quadrupole ion trap or linear ion trap, and after the ions are cooled, an amount of initial energy is collectively given to the ions to send them into the flight space inside the flight tube 3, instead of accelerating the extracted ions to inject them directly into the flight space. Naturally, that process may additionally include the operations of selecting an ion and subjecting it to collision induced dissociation within the ion trap to generate product ions for a specific kind of precursor ion and send them into the flight space to perform a mass spectrometry with high resolving power. Taking into account the fact that the mass-resolving power of an ion trap is normally not very high, a time-of-flight mass separator using one or two reflectrons having the previously described configuration may be used for each of the operations of selecting a precursor and performing a mass spectrometry of product ions.

It should be noted that all the foregoing embodiments are mere examples of the present invention, and any change, modification or addition which has been appropriately made in any respect other than those mentioned in the previous descriptions, and within the spirit of the present invention, will naturally fall within the scope of claims of the present patent application.

EXPLANATION OF NUMERALS

1 . . . Ion Source
2 . . . Accelerating Electrode
3 . . . Flight Tube
4, 4A, 4B . . . Reflectron
41, 41*a*, 41*b* . . . Ring Electrode
42 . . . Plate Electrode
5 . . . Detector
6 . . . Reflectron DC Voltage Source
7 . . . Accelerating Voltage Source
8 . . . Controller
9 . . . Data Processor
A . . . Free-Flight Space
B . . . Decelerating Region
B1, B2 . . . Uniform Decelerating Electric Field B
B3 . . . Free-Flight Space
C . . . Reflecting Region
D . . . Accelerating Region
c . . . Central Axis

The invention claimed is:

1. A time-of-flight mass spectrometer having an energy supplier for giving ions to be analyzed a constant amount of energy to make the ions fly and a time-of-flight mass separator for separating the energy-given ions for each mass-to-charge ratio according to the difference in their flight time, wherein:

the mass separator includes a free-flight space in which ions are allowed to fly without being influenced by an electric field, a reflectron having a plurality of electrodes for creating an electric field which acts on the ions flying in the free-flight space to reflect the ions backward, and a voltage supplier for applying a direct-current voltage to each of the electrodes of the reflectron; and the voltage supplier applies the direct-current voltage to each of the electrodes so that:

the electrostatic field created by the reflectron is virtually divided into a decelerating region for decelerating ions introduced thereinto and a reflecting region for reflecting backward the ions which have been decelerated through the decelerating region, the two regions being arranged along a traveling direction of the ions;

the potential distribution along a central axis of the electrostatic field in the decelerating region is either a potential distribution defined by one kind of function or a combination of potential distributions defined by a plurality of different kinds of functions along the central axis; and the potential distribution along the central axis of the electrostatic field in the reflecting region is one kind of curved potential distribution for which a conditional equation to be satisfied by a flight time $T_r(E)$ of the ions in the reflecting region is determined so that a total flight time required for an ion having an initial energy equal to a reference potential $U_0$ set at a level equal to or lower than a maximal potential value $U_d$ in the decelerating region to fly through a round-trip path including the free-flight space, will be equal to a total flight time required for an ion having an initial energy E higher than $U_d$ to fly through a round-trip path including the free-flight space, a following equation is used as a relational equation for determining an inverse function x(U) of the curved potential distribution U(x) in the reflecting region realizing the flight time $T_r(E)$, and an integral computation in that equation is either an analytic formula using a parameter defining the potential distribution of the electrostatic field in the decelerating field or a numerical solution obtained by a numerical computation:

$$x(U) = \frac{1}{\pi\sqrt{2m}} \int_0^U \frac{T_r(E)dE}{\sqrt{U-E}}$$

where m is a mass of an arbitrary ion of interest.

2. The time-of-flight mass spectrometer according to claim 1, wherein:

the decelerating region includes two-stage uniform decelerating electric fields defined by two kinds of functions each of which has a different linear potential gradient; and with the reference potential $U_0$ set to be equal to the maximal potential $U_d$ of the decelerating region, the curved potential distribution along the central axis of the electrostatic field in the reflecting region is determined by an inverse function x(U) expressed as a following equation:

$$x(U) = \frac{L}{\pi}\left[\sqrt{\frac{U}{U_d}} - \arctan\sqrt{\frac{U}{U_d}} + 2\frac{d_1}{U_1}\left\{\sqrt{UU_d} - (U+U_d)\arctan\sqrt{\frac{U}{U_d}}\right\} - 2\left(\frac{d_1}{U_1} - \frac{d_2}{U_2}\right)\left\{\sqrt{UU_2} - (U+U_2)\arctan\sqrt{\frac{U}{U_2}}\right\} + \pi\frac{d_2}{U_2}U\right]$$

where L is a length of the free-flight space, $d_1$ and $d_2$ are ratios of lengths of the first-stage uniform decelerating electric field and the second-stage uniform decelerating electric field in the decelerating region to a length of the free-flight space, respectively, $U_1$ is a potential height of the first-stage uniform decelerating electric field, and $U_2$ is a potential height of the second-stage uniform decelerating electric field, hence $U_d=U_1+U_2$.

3. The time-of-flight mass spectrometer according to claim 2, wherein:

$d_1=d_2=d$; and d is within the range of $0.01<d<0.5$.

4. The time-of-flight mass spectrometer according to claim 2, wherein:

$d_1=d_2=d$; and d has a value which satisfies a following equation:

$$d = \frac{u_2^{3/2}(\sqrt{u_2}+1)}{4(\sqrt{u_2}-u_2+1)}$$

where $u_2=U_2/U_d$.

5. The time-of-flight mass spectrometer according to claim 1, wherein:

the decelerating region includes two-stage uniform decelerating electric fields and an auxiliary free-flight space located between the two-stage uniform decelerating electric fields, the two-stage uniform decelerating electric fields being defined by two kinds of functions each of which has a different linear potential gradient, and the auxiliary free-flight space being free from influence of any electric field; and with the reference potential $U_0$ set to be equal to the maximal potential $U_d$ of the decelerating region, the curved potential distribution along the central axis of the electrostatic field in the reflecting region is determined by an inverse function x(u) expressed as a following equation:

$$x(u)=\frac{L}{\pi}\Bigg[\pi\ d_2\frac{u}{u_2}+\sqrt{u}-\arctan\sqrt{u}+2\frac{d_1}{u_1}\left\{\sqrt{u}-(u+1)\arctan\sqrt{u}\right\}+2f\left\{\sqrt{\frac{u}{u_2}}-\arctan\sqrt{\frac{u}{u_2}}\right\}-2\left(\frac{d_1}{u_1}-\frac{d_2}{u_2}\right)\left\{\sqrt{uu_2}-(u+u_2)\arctan\sqrt{\frac{u}{u_2}}\right\}\Bigg]$$

where L is a length of the free-flight space, $d_1$, f and $d_2$ are ratios of lengths of the first-stage uniform decelerating electric field, the auxiliary free-flight space and the second-stage decelerating electric field in the decelerating region, respectively, $U_1$ is a potential height of the first-stage uniform decelerating electric field, $U_2$ is a potential height of the second-stage uniform decelerating electric field, hence $U_d=U_1+U_2$, and $u=U/U_d$, $u_1=U_1/U_d$, and $u_2=U_2/U_d$.

6. The time-of-flight mass spectrometer according to claim 5, wherein:

d has a value which satisfies a following equation:

$$d=\frac{(2f+u_2^{3/2})(\sqrt{u_2}+1)}{4(\sqrt{u_2}-u_2+1)}$$

provided that $d_1=d_2=d$.

7. The time-of-flight mass spectrometer according to claim 1, wherein:

the energy supplier includes a one-stage uniform accelerating electric field defined by a linear potential gradient sloped downward in a traveling direction of the ions, whereas the decelerating region includes two-stage uniform decelerating electric fields defined by two kinds of functions each of which has a different linear potential gradient; and with the reference potential $U_0$ set to be equal to the maximal potential $U_d$ of the decelerating region, the curved potential distribution along the central axis of the electrostatic field in the reflecting region is determined by an inverse function x(u) expressed as a following equation:

-continued $$x(u)=\frac{L}{\pi}\Bigg[\pi\ \frac{d_2}{u_2}u+\sqrt{u}-\arctan\sqrt{u}+\left(\frac{a}{u_a}+2\frac{d_1}{u_1}\right)\left\{\sqrt{u}-(u+1)\arctan\sqrt{u}\right\}-2\left(\frac{d_1}{u_1}-\frac{d_2}{u_2}\right)\left\{\sqrt{uu_2}-(u+u_2)\arctan\sqrt{\frac{u}{u_2}}\right\}\Bigg]$$

where $U_a$ is a highest potential of the uniform accelerating electric field, L is a length of the free-flight space, a, $d_1$, and $d_2$ are a ratios of a lengths of the uniform accelerating electric field, the first-stage uniform decelerating electric field and the second-stage decelerating electric field in the decelerating region, respectively, $U_1$ is a potential height of the first-stage uniform decelerating electric field, $U_2$ is a potential height of the second-stage uniform decelerating electric field, hence $U_d=U_1+U_2$, and $u=U/U_d$, $u_1=U_1/U_d$, $u_2=U_2/U_d$ and $u_a=U_a/U_d$.

8. The time-of-flight mass spectrometer according to claim 7, wherein:

d has a value which satisfies a following equation:

$$4d\frac{\sqrt{u_2}-u_2+1}{u_2^{3/2}(\sqrt{u_2}+1)}=1-\frac{2a}{u_a}$$

provided that $d_1=d_2=d$.

9. The time-of-flight mass spectrometer according to claim 1, wherein:

the decelerating region includes a one-stage uniform decelerating electric field defined by a function having a linear potential gradient; and with the reference potential $U_0$ set to be equal to the maximal potential $U_d$ of the decelerating region, the curved potential distribution along the central axis of the electrostatic field in the reflecting region is determined by an inverse function x(U) expressed as a following equation:

$$x(U)=\frac{L}{\pi}\left[\pi\ d\frac{U}{U_d}+(1+2d)\sqrt{\frac{U}{U_d}}-\left(1+2d+2d\frac{U}{U_d}\right)\arctan\sqrt{\frac{U}{U_d}}\right]$$

where L is a length of the free-flight space, d is a ratio of a length of the decelerating region to a length of the free-flight space, and d is set within a range of $0.2<d<0.8$.

10. The time-of-flight mass spectrometer according to claim 9, wherein d is 0.25.

11. The time-of-flight mass spectrometer according to claim 1, wherein:

the energy supplier includes a one-stage uniform accelerating electric field defined by a linear potential gradient sloped downward in a traveling direction of the ions, and the decelerating region includes a one-stage uniform decelerating electric field defined by a function having a linear potential gradient; and with the reference potential $U_0$ set to be equal to the maximal potential $U_d$ of the decelerating region, the curved potential distribution along the central axis of the electrostatic field in the reflecting region is determined by an inverse function x(u) expressed as a following equation:

$$x(u)=\frac{L}{\pi}\left[\pi\ du+\sqrt{u}-\arctan\sqrt{u}+\left(\frac{a}{u_a}+2d\right)\left\{\sqrt{u}-(u+1)\arctan\sqrt{u}\right\}\right]$$

where $U_a$ is a highest potential of the uniform accelerating electric field, L is a length of the free-flight space, a and d are ratios of lengths of the uniform accelerating electric field and the decelerating region to a length of the free-flight space, respectively, $u=U/U_d$, and $u_a=U_a/U_d$.

12. The time-of-flight mass spectrometer according to claim 11, wherein:

d has a value which satisfies:

$$4d=1-(2a/u_a)$$

13. The time-of-flight mass spectrometer according to claim 1, wherein:

the voltage supplier uses resistive division to apply a voltage to at least one electrode among the plurality of electrodes constituting the reflectron, and the interval between the aforementioned one electrode and a neighboring electrode is adjusted so as to create a desired potential distribution.

14. The time-of-flight mass spectrometer according to claim 13, wherein:

the voltage supplier includes a ladder-type resistive divider circuit designed to separately apply a voltage to each of the electrodes other than those at both ends among the plurality of electrodes constituting the reflecting region in the reflectron.

* * * * *